US010270187B2

(12) United States Patent
Morita et al.

(10) Patent No.: US 10,270,187 B2
(45) Date of Patent: Apr. 23, 2019

(54) CHARGING CONNECTOR AND METHOD OF MANUFACTURING CHARGING CONNECTOR ASSEMBLY

(71) Applicant: FUJIKURA LTD., Tokyo (JP)

(72) Inventors: Kohei Morita, Sakura (JP); Nobuaki Inoue, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/756,173

(22) PCT Filed: Dec. 26, 2016

(86) PCT No.: PCT/JP2016/088774
§ 371 (c)(1),
(2) Date: Feb. 28, 2018

(87) PCT Pub. No.: WO2017/111175
PCT Pub. Date: Jun. 29, 2017

(65) Prior Publication Data
US 2018/0248275 A1    Aug. 30, 2018

(30) Foreign Application Priority Data
Dec. 25, 2015    (JP) .................................. 2015-253575

(51) Int. Cl.
H01R 4/30          (2006.01)
B60L 53/16         (2019.01)
(Continued)

(52) U.S. Cl.
CPC ................ H01R 4/30 (2013.01); B60L 53/16 (2019.02); H01R 13/5213 (2013.01);
(Continued)

(58) Field of Classification Search
CPC ...... H01R 4/30; H01R 13/5213; H01R 13/56; H01R 13/62; H01R 43/00; H01R 43/005; H01R 43/18; H01R 13/659; B60L 11/1818
(Continued)

(56) References Cited

U.S. PATENT DOCUMENTS 4,634,208 A * 1/1987 Hall ........................ H01R 9/032
                                                  439/607.51
4,960,388 A * 10/1990 Frantz .................... H01R 9/031
                                                  439/404
(Continued)

FOREIGN PATENT DOCUMENTS

CN    104241943 A    12/2014
JP    S28-003467 Y    4/1953
(Continued)

OTHER PUBLICATIONS

International Search Report dated Mar. 21, 2017, issued in counterpart International Application No. PCT/JP2016/088774 (2 pages).
(Continued)

Primary Examiner — Harshad C Patel
(74) Attorney, Agent, or Firm — Westerman, Hattori, Daniels & Adrian, LLP

(57) ABSTRACT

A charging connector that facilitates a routing operation of an electric cable and is unlikely to cause contact failure between a connection terminal and an electric cable is provided. The charging connector has a housing having socket portions extending along an axial direction, connection terminals accommodated in terminal receptacle portions formed radially inward of the socket portions, and a rotation regulator structure operable to regulate rotation of the connection terminals about their axes with respect to the socket portions. The connection terminal includes a plug connection portion to which a terminal of the charging plug can be
(Continued)

connected and a terminal coupling portion located at an opposite side of the plug connection portion in the axial direction. The fixture terminal is coupled to the terminal coupling portion. The rotation regulator structure includes terminal engagement portions formed in the connection terminal and socket engagement portions formed on the socket portions.

16 Claims, 40 Drawing Sheets

(51) Int. Cl.
    *H01R 13/52*     (2006.01)
    *H01R 43/18*     (2006.01)
    *H01R 13/62*     (2006.01)
    *H01R 43/00*     (2006.01)
    *H01R 13/56*     (2006.01)

(52) U.S. Cl.
    CPC ............ *H01R 13/56* (2013.01); *H01R 13/62* (2013.01); *H01R 43/00* (2013.01); *H01R 43/005* (2013.01); *H01R 43/18* (2013.01)

(58) Field of Classification Search
    USPC .......................................................... 439/660
    See application file for complete search history.

(56) References Cited

U.S. PATENT DOCUMENTS

| | | | | |
|---|---|---|---|---|
| 5,458,496 | A * | 10/1995 | Itou | B60L 11/1818 439/34 |
| 5,637,977 | A * | 6/1997 | Saito | B60L 11/1818 320/109 |
| 5,830,006 | A * | 11/1998 | Koumatsu | H01R 13/5213 439/449 |
| 6,123,569 | A * | 9/2000 | Fukushima | B60L 11/1818 439/310 |
| 8,241,046 | B2 * | 8/2012 | Takagi | H01R 13/6594 439/83 |
| 8,851,937 | B2 * | 10/2014 | Kawai | H01R 13/6315 439/754 |
| 8,905,797 | B2 | 12/2014 | Wu et al. | |
| 2008/0268695 | A1 | 10/2008 | Dieterle et al. | |
| 2011/0034053 | A1 * | 2/2011 | Matsumoto | B60L 3/0069 439/304 |
| 2011/0059659 | A1 * | 3/2011 | Matsumoto | H01R 13/426 439/733.1 |
| 2012/0058658 | A1 * | 3/2012 | Yeon | H01R 13/502 439/271 |
| 2012/0231644 | A1 | 9/2012 | Kinoshita | |
| 2013/0330952 | A1 * | 12/2013 | Mori | H01R 13/426 439/271 |
| 2013/0337693 | A1 * | 12/2013 | Mori | H01R 13/5205 439/626 |
| 2015/0147918 | A1 * | 5/2015 | Matsuda | B60L 11/18 439/694 |
| 2015/0222049 | A1 | 8/2015 | Armacost et al. | |
| 2015/0258905 | A1 * | 9/2015 | Fukushima | H01R 13/506 439/34 |
| 2015/0288083 | A1 | 10/2015 | Kashiwada et al. | |
| 2016/0072224 | A1 * | 3/2016 | Ichio | B60L 11/1818 439/345 |

FOREIGN PATENT DOCUMENTS

| | | |
|---|---|---|
| JP | 29-17355 Y1 | 12/1954 |
| JP | 46-28742 Y1 | 10/1971 |
| JP | 2010-525547 A | 7/2010 |
| JP | 2011-108633 A | 6/2011 |
| JP | 2014-046844 A | 3/2014 |
| JP | 2014-53091 A | 3/2014 |
| JP | 2015-82466 A | 4/2015 |
| JP | 2015-103377 A | 6/2015 |
| JP | 2015-170588 A | 9/2015 |
| JP | 2015-198033 A | 11/2015 |
| WO | 2008/134125 A1 | 11/2008 |

OTHER PUBLICATIONS

European Search Report dated Jan. 31, 2019, issued in counterpart European Patent Application No. 16879059.0.
Japanese Office Action dated Mar. 12, 2019, issued in counterpart Japanese Patent Application No. 2017-558339 with Engish translation. (15 pages).

* cited by examiner

CHARGING CONNECTOR AND METHOD OF MANUFACTURING CHARGING CONNECTOR ASSEMBLY

TECHNICAL FIELD

The present invention relates to a charging connector and a method of manufacturing a charging connector assembly, and more particularly to a method of manufacturing a charging connector assembly by attaching an electric cable to a charging connector to be provided on an electric vehicle or a plug-in hybrid vehicle.

BACKGROUND ART

Automobiles using an electric motor as a source of driving forces, such as electric vehicles and plug-in hybrid vehicles, have been popularized in recent years. Those automobiles have a secondary cell mounted thereon for supplying electric power to an electric motor. Thus, the secondary cell should be charged as needed. In order to charge this secondary cell, a charging connector is provided on a vehicle body. When a charging plug provided at an end of a charging cable extending from a power source is fitted into the charging connector, the power source and the secondary cell are connected to each other so that the secondary cell is charged.

Such a charging connector is often disposed on a side surface of a vehicle body in consideration of the accessibility upon attachment of the charging plug to and detachment of the charging plug from the charging connector. In this case, electric cables (wire harness) extending from the charging connector to the secondary cell are desired to be disposed along the side surface of the vehicle body in order to widen an inside space of the vehicle. Therefore, there has been known a charging connector assembly in which terminal portions of electric cables are welded perpendicular to terminal pieces of the charging connector such that the electric cables extend along a side surface of a vehicle from the charging connector (see, e.g., Patent Literature 1). Such a charging connector assembly is manufactured by first welding a core wire exposed at an end of an electric cable to a terminal piece and then inserting the terminal piece into a terminal receptacle of a housing.

In this charging connector assembly, the electric cable connected to the charging connector is a high-voltage cable, which has a large diameter. Thus, the electric cable is stiff and is unlikely to be bent. Therefore, if the terminal piece is to be inserted into the terminal receptacle of the housing in a state in which the electric cable runs on another electric cable, then forces are applied to a welded portion between the core wire of the electric cable and the terminal piece, where stresses are concentrated. Accordingly, cracks occur at an interface between the terminal piece and the core wire and thus result in contact failure and the like.

In order to prevent an electric cable from running on another electric cable, when a terminal piece is inserted into a terminal receptacle of a housing, an operator should work such that the electric cable to be inserted does not run on another electric cable while confirming the position of the electric cable that has been attached to the terminal piece. Thus, a cumbersome routing operation is required.

PRIOR ART LITERATURE

Patent Literature

Patent Literature 1: JP 2015-170588 A

SUMMARY OF THE INVENTION

Problem(s) to be Solved by the Invention

The present invention has been made in view of the above drawback in the prior art. It is a first object of the present invention to provide a charging connector that facilitates a routing operation of an electric cable and is unlikely to cause contact failure between a connection terminal and an electric cable.

Furthermore, a second object of the present invention is to provide a method of manufacturing a charging connector assembly that facilitates a routing operation of an electric cable and is unlikely to cause contact failure between a connection terminal and an electric cable.

Means for Solving Problem(s)

According to a first aspect of the present invention, there is provided a charging connector for electrically connecting an electric cable connected via a fixture terminal and a charging plug to each other. The charging connector has a housing having at least one socket portion extending along an axial direction, a conductive connection terminal accommodated in a terminal receptacle portion formed radially inward of the socket portion, and a rotation regulator structure operable to regulate rotation of the connection terminal about its axis with respect to the socket portion. The connection terminal includes a plug connection portion to which a terminal of the charging plug can be connected and a terminal coupling portion located at an opposite side of the plug connection portion in the axial direction. The fixture terminal is coupled to the terminal coupling portion.

With such a configuration, while the connection terminal is first attached onto the terminal receptacle portion of the socket portion of the housing, the electric power cable can be connected to the connection terminal via the fixture terminal. Therefore, the connection terminal and the core wire of the electric power cable can electrically be connected to each other without excessive forces applied to the connection terminal. Accordingly, it is possible to prevent any contact failure resulting from cracks between the connection terminal and the core wire of the electric power cable and to maintain good electrical connection between the connection terminal and the electric cable. Furthermore, the electric power cable can flexibly be routed without various restrictions imposed on insertion of the connection terminal into the terminal receptacle portion. Therefore, a routing operation of the electric power cable is greatly facilitated.

Furthermore, the rotation regulator structure positions the connection terminal in the circumferential direction within the terminal receptacle portion and fixes the connection terminal in the circumferential direction. Therefore, the fixture terminal does not rotate with respect to the connection terminal. Thus, the bolt is prevented from being loosened. Accordingly, good electrical connection can be maintained between the fixture terminal and the connection terminal.

The rotation regulator structure may include at least one terminal engagement portion formed on the connection terminal and at least one socket engagement portion formed on the socket portion. In this case, the rotation regulator structure regulates rotation of the connection terminal by engagement of the at least one terminal engagement portion and the at least one socket engagement portion.

The at least one terminal engagement portion may include a plurality of terminal engagement portions formed at locations that are symmetrical to each other with respect to an axis of the connection terminal, and the at least one socket engagement portion may include a plurality of socket engagement portions formed at locations that are symmetrical to each other with respect to an axis of the socket portion. With such a configuration, when any one of the terminal engagement portion and the socket engagement portion is engaged with the corresponding socket engagement portion or terminal engagement portion, another engagement portion of the terminal engagement portion and the socket engagement portion is also engaged with the corresponding socket engagement portion or terminal engagement portion. Accordingly, alignment of the connection terminal about its axis is facilitated.

Furthermore, the terminal coupling portion of the connection terminal may have an engagement surface with which an engagement piece provided on the fixture terminal is engaged. With such a configuration, in an automobile having an internal combustion engine, such as a hybrid vehicle, even if vibration is transmitted to the fixture terminal from the internal combustion engine, the engagement piece of the fixture terminal is engaged with the engagement surface of the connection terminal. Therefore, the fixture terminal does not rotate with respect to the connection terminal. Thus, the fastener is prevented from being loosened. Accordingly, good electrical connection can be maintained between the fixture terminal and the connection terminal.

The terminal coupling portion of the connection terminal may have an attachment surface that is perpendicular to the axial direction of the connection terminal, and the fixture terminal secured to the connection terminal may be in contact with the attachment surface. Alternatively, the terminal coupling portion of the connection terminal may have an attachment surface that is in parallel to the axial direction of the connection terminal, and the fixture terminal secured to the connection terminal may be in contact with the attachment surface.

The charging connector may further have an end cap detachably attached to an end of the socket portion so as to hold the connection terminal within the terminal receptacle portion. Furthermore, the rotation regulator structure may include at least one terminal engagement portion formed on the connection terminal and at least one cap engagement portion formed on the end cap. In this case, the rotation regulator structure regulates rotation of the connection terminal by engagement of the at least one terminal engagement portion and the at least one cap engagement portion.

The at least one terminal engagement portion may be formed on the terminal coupling portion of the connection terminal.

The terminal coupling portion of the connection terminal may include a larger-diameter portion on which the at least one terminal engagement portion is formed and a smaller-diameter portion having a diameter smaller than a diameter of the larger-diameter portion. Thus, the weight of the connection terminal can be reduced by reducing the diameter of the smaller-diameter portion of the terminal coupling portion as compared to the diameter of the larger-diameter portion.

The at least one terminal engagement portion may have a terminal engagement surface extending in parallel to the axis of the connection terminal, and the at least one cap engagement portion may have a cap engagement surface extending in parallel to the terminal engagement surface.

It is preferable for the end cap to have at least one cap portion having a wall surface configured to abut a side surface of the fixture terminal to regulate rotation of the fixture terminal. Since such a wall surface can regulate rotation of the fixture terminal, the fixture terminal can be prevented from rotating due to vibration caused by the internal combustion engine. Thus, good electrical connection can be maintained between the fixture terminal and the connection terminal.

The at least one terminal engagement portion may have a terminal engagement surface extending in parallel to the axis of the connection terminal, and the at least one cap engagement portion may have a cap engagement surface extending in a continuous manner from the wall surface of the cap portion and in parallel to the terminal engagement surface. When the cap engagement surface of the cap portion is thus formed in a continuous manner with the wall surface, formation of the cap portion is facilitated.

The at least one socket portion may include a plurality of socket portions arranged adjacent to each other, and the at least one cap portion may include a plurality of cap portions provided so as to correspond to the plurality of socket portions arranged adjacent to each other. In this case, the wall surface of each of the plurality of cap portions may extend perpendicular to a direction in which the plurality of socket portions are arranged adjacent to each other. With such a configuration, a portion of the end cap that has an electrical insulating property can be located between the fixture terminals attached to the adjacent cap portions. Thus, the creepage distance can be lengthened between the fixture terminals. Accordingly, the safety upon attachment of a high-voltage electric power cable to the charging connector can be enhanced.

According to a second aspect of the present invention, there is provided a method of manufacturing a charging connector assembly including a charging connector to which a charging plug can be attached and an electric cable connected to the charging connector. This method includes preparing a housing having a cylindrical socket portion with a terminal receptacle portion formed inward of the socket portion and preparing a conductive connection terminal having a plug connection portion to which a terminal of the charging plug can be connected and a terminal coupling portion located at an opposite side of the plug connection portion in an axial direction. The connection terminal is inserted into the terminal receptacle portion of the socket portion along the axial direction while at least one terminal engagement portion formed on the connection terminal and at least one socket engagement portion formed on the socket portion are engaged with each other to regulate rotation of the connection terminal about its axis with respect to the socket portion. A conductive fixture terminal having an insertion hole formed therein is prepared, and an end of the electric cable is secured to the fixture terminal to electrically connect the electric cable to the fixture terminal. After the connection terminal has been inserted into the terminal receptacle portion of the socket portion, a fastener is inserted through the insertion hole of the fixture terminal to which the end of the electric cable has been secured, and the fastener is fastened to a fastening hole formed in the terminal coupling portion of the connection terminal to secure the fixture terminal to the connection terminal.

According to a third aspect of the present invention, there is provided a method of manufacturing a charging connector assembly including a charging connector to which a charging plug can be attached and an electric cable connected to the charging connector. This method includes preparing a housing having a cylindrical socket portion with a terminal receptacle portion formed inward of the socket portion and preparing a conductive connection terminal having a plug connection portion to which a terminal of the charging plug can be connected and a terminal coupling portion located at an opposite side of the plug connection portion in an axial direction. The connection terminal is inserted into the terminal receptacle portion of the socket portion along the axial direction. An end cap for holding the connection terminal within the terminal receptacle portion is prepared. The end cap is attached to an end of the socket portion while at least one terminal engagement portion formed on the connection terminal and at least one cap engagement portion formed on the end cap are engaged with each other to regulate rotation of the connection terminal about its axis with respect to the socket portion. Furthermore, a conductive fixture terminal having an insertion hole formed therein is prepared, and an end of the electric cable is secured to the fixture terminal to electrically connect the electric cable to the fixture terminal. After the end cap has been attached to the end of the socket portion, a fastener is inserted through the insertion hole of the fixture terminal to which the end of the electric cable has been secured, and the fastener is fastened to a fastening hole formed in the terminal coupling portion of the connection terminal to secure the fixture terminal to the connection terminal.

With such a process, while the connection terminal is first attached onto the terminal receptacle portion of the socket portion of the housing, the electric power cable can be connected to the connection terminal via the fixture terminal. Therefore, the connection terminal and the core wire of the electric power cable can electrically be connected to each other without excessive forces applied to the connection terminal. Accordingly, it is possible to prevent any contact failure resulting from cracks between the connection terminal and the core wire of the electric power cable and to maintain good electrical connection between the connection terminal and the electric cable. Furthermore, the electric power cable can flexibly be routed without various restrictions imposed on insertion of the connection terminal into the terminal receptacle portion. Therefore, a routing operation of the electric power cable is greatly facilitated.

Furthermore, the connection terminal is aligned in the circumferential direction within the terminal receptacle portion by engagement of the terminal engagement portion with the socket engagement portion or the cap engagement portion. The connection terminal is fixed in the circumferential direction. Accordingly, even if a force is applied to the connection terminal about the axis of the connection terminal when the fastener is fastened, the fastener can be fastened without rotating the connection terminal within the terminal receptacle portion.

Advantageous Effects of the Invention

According to the present invention, while the connection terminal is first attached onto the terminal receptacle portion of the socket portion of the housing, the electric power cable can be connected to the connection terminal via the fixture terminal. Therefore, the connection terminal and the core wire of the electric power cable can electrically be connected to each other without excessive forces applied to the connection terminal. Accordingly, it is possible to prevent any contact failure resulting from cracks between the connection terminal and the core wire of the electric power cable and to maintain good electrical connection between the connection terminal and the electric cable. Furthermore, the electric power cable can flexibly be routed without various restrictions imposed on insertion of the connection terminal into the terminal receptacle portion. Therefore, a routing operation of the electric power cable is greatly facilitated. Furthermore, the rotation regulator structure positions the connection terminal in the circumferential direction within the terminal receptacle portion and fixes the connection terminal in the circumferential direction. Therefore, the fixture terminal does not rotate with respect to the connection terminal. Thus, the bolt is prevented from being loosened. Accordingly, good electrical connection can be maintained between the fixture terminal and the connection terminal.

MODE(S) FOR CARRYING OUT THE INVENTION

Figure 1:
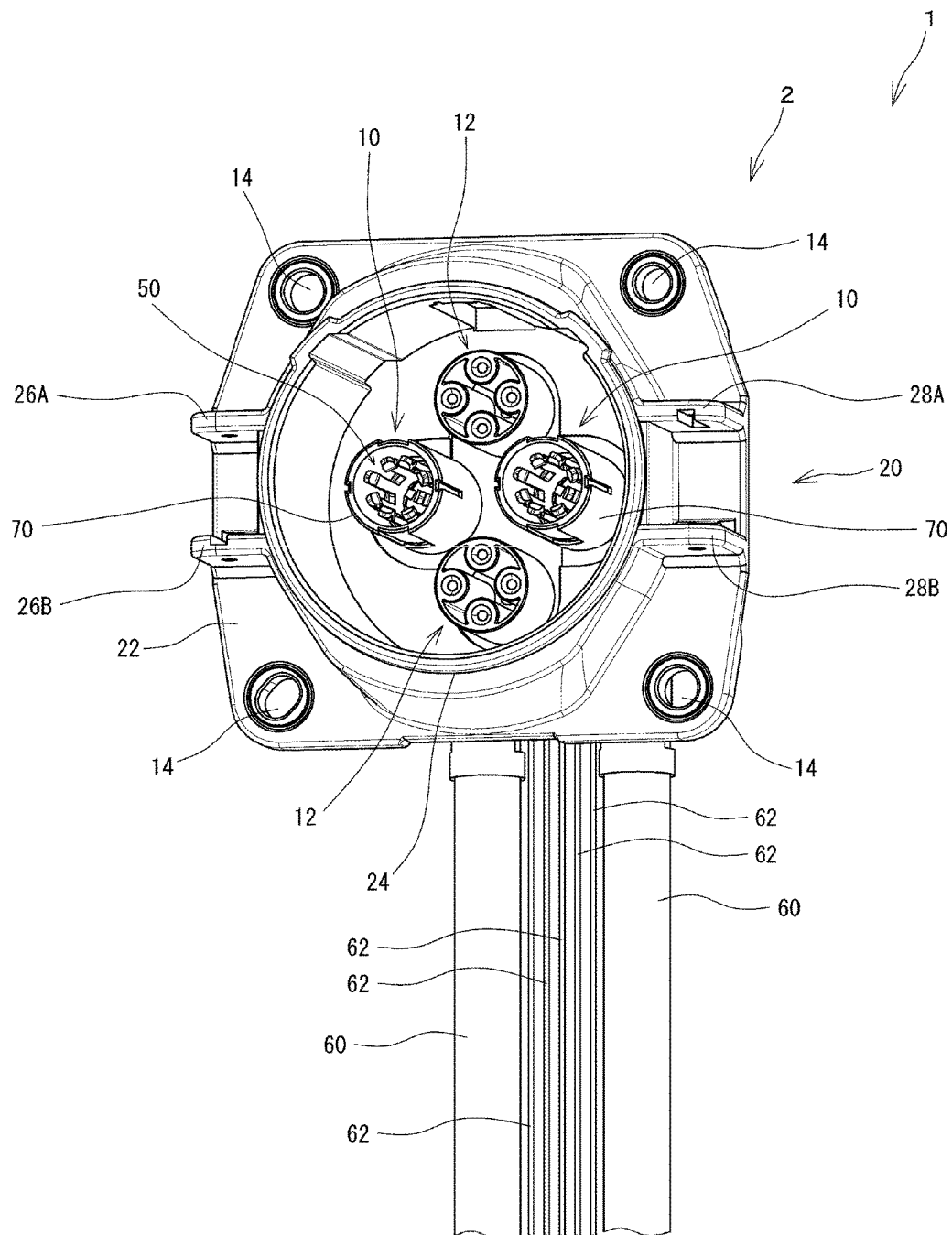
FIG. 1 is a perspective view showing a charging connector assembly according to a first embodiment of the present invention.

Embodiments of a charging connector and a method of manufacturing a charging connector assembly according to the present invention will be described in detail below with reference to FIGS. 1 to 35. In FIGS. 1 to 35, the same or corresponding components are denoted by the same or corresponding reference numerals and will not be described below repetitively. Furthermore, in FIGS. 1 to 35, the scales or dimensions of components may be exaggerated, or some components may be omitted.

Figure 2:
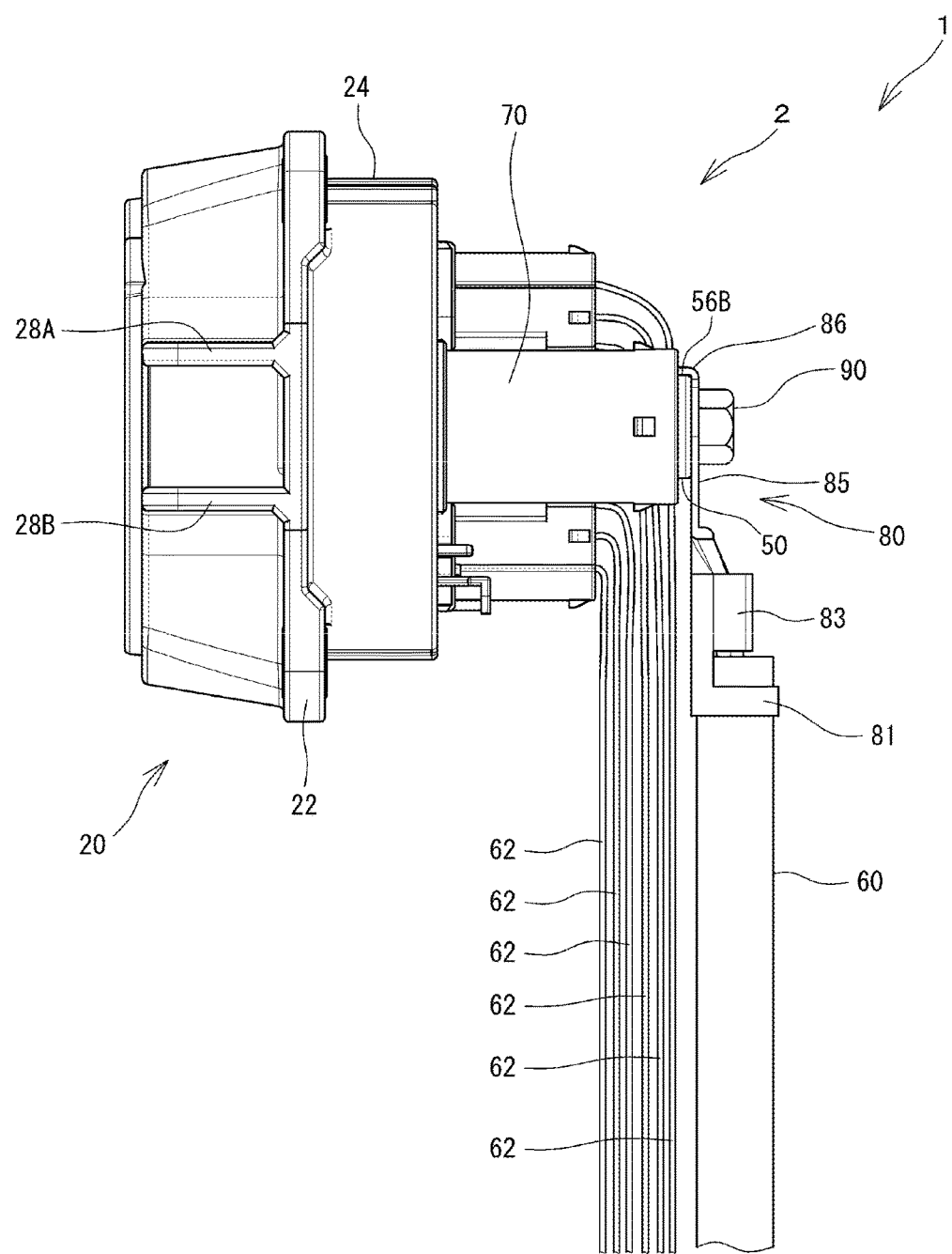
FIG. 2 is a right side view of the charging connector assembly shown in FIG. 1.
Figure 3:
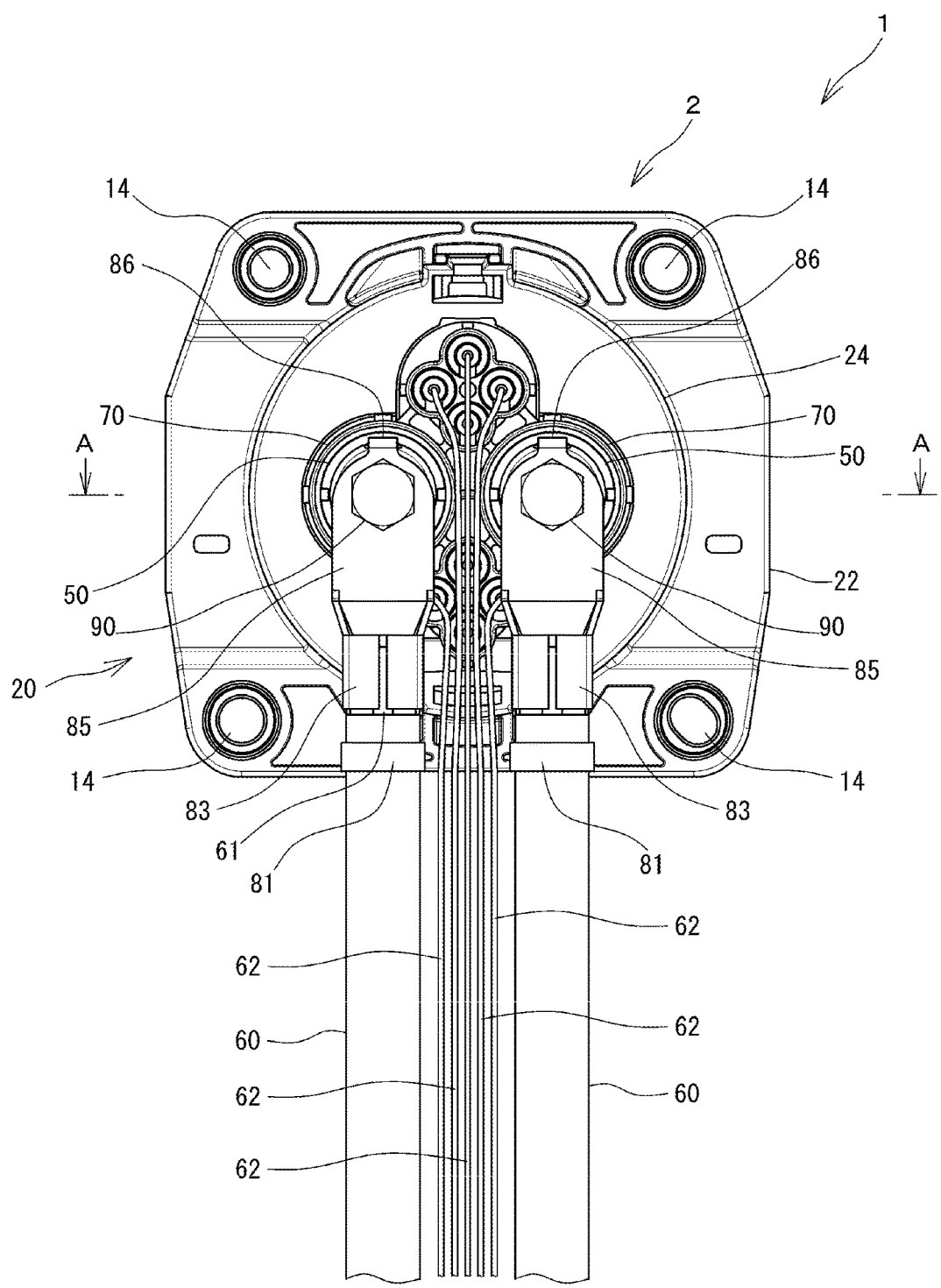
FIG. 3 is a rear view of the charging connector assembly shown in FIG. 1.
Figure 4:
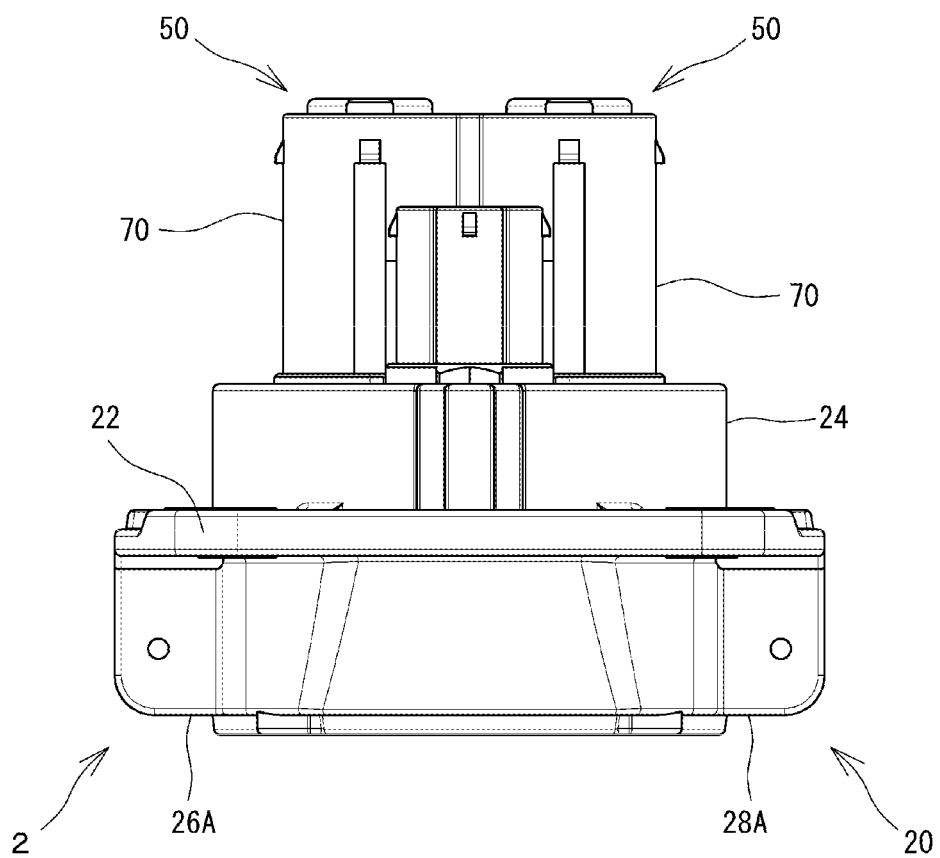
FIG. 4 is a plan view of the charging connector assembly shown in FIG. 1.

First, a charging connector assembly 1 according to a first embodiment of the present invention will be described with reference to FIGS. 1 to 19. FIG. 1 is a perspective view showing a charging connector assembly 1 according to the present embodiment, FIG. 2 is a right side view thereof, FIG. 3 is a rear view thereof, FIG. 4 is a plan view thereof, FIG. 5 is a cross-sectional view taken along line A-A of FIG. 3, and FIG. 6 is a cross-sectional view taken along line B-B of FIG. 5.

The charging connector assembly 1 according to the present embodiment includes a charging connector 2 attached to a vehicle body of an automobile such as an electric vehicle or a plug-in hybrid vehicle, electric power cables 60 connected to the charging connector 2 via fixture terminals 80, and electric signal cables 62 connected to the charging connector 2. The electric power cables 60 extend to a secondary cell (not shown) for supplying electric power to an electric motor. A charging plug (not shown) provided at an end of a charging cable extending from a power source can be fitted into the charging connector 2. When the charging plug is fitted into the charging connector 2, the power source and the secondary cell are connected to each other via the electric power cables 60 so that the secondary cell is charged. Furthermore, the electric signal cables 62 extend to various kinds of controllers provided in the vehicle. The electric signal cables 62 are used to transmit signals between signal terminals provided on the charging plug and the controllers. In FIGS. 4 to 6, for the sake of clarity, the fixture terminals 80, the electric power cables 60, and the electric signal cables 62 are omitted from the illustration.

Figure 5:
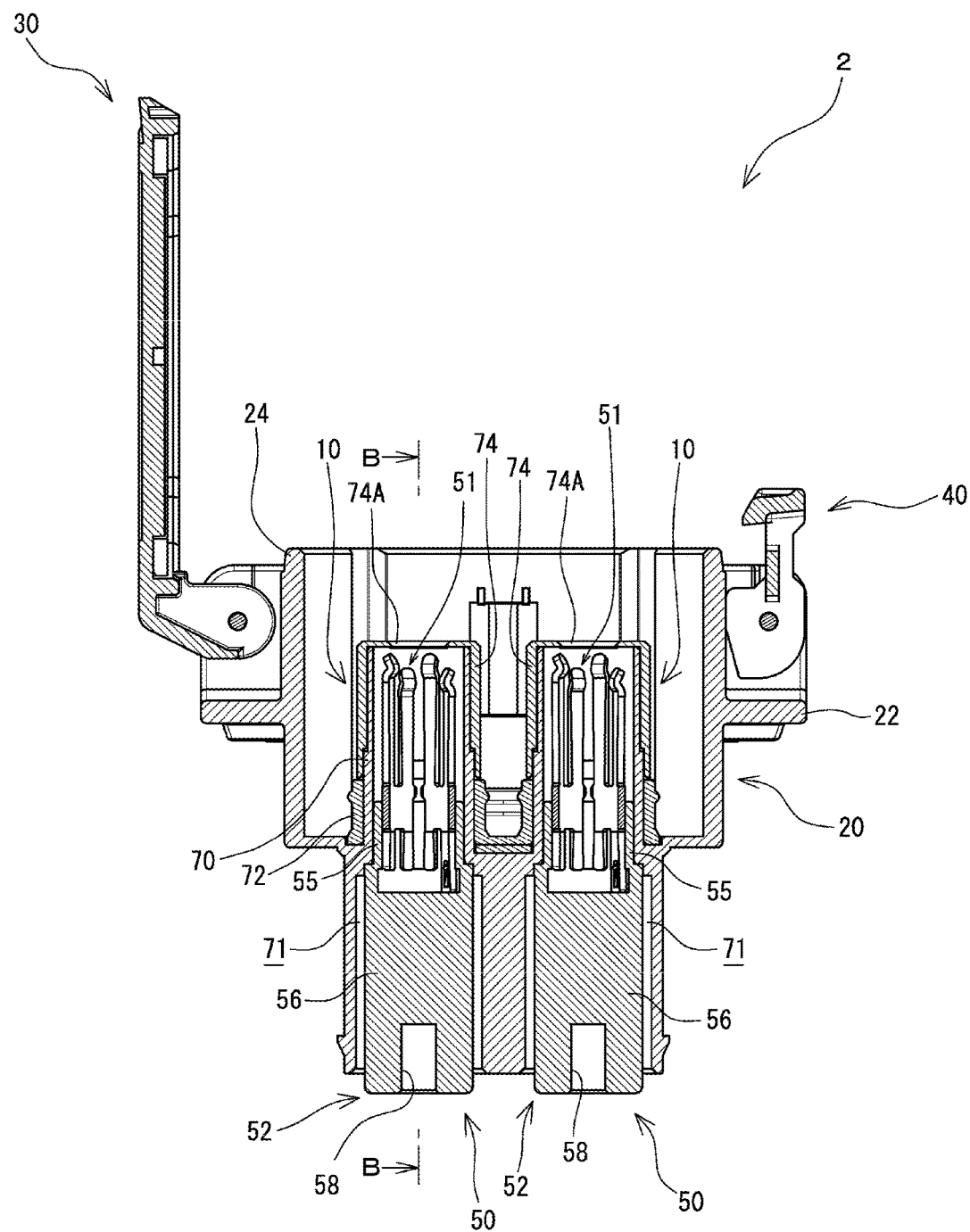
FIG. 5 is a cross-sectional view taken along line A-A of FIG. 3.
Figure 6:
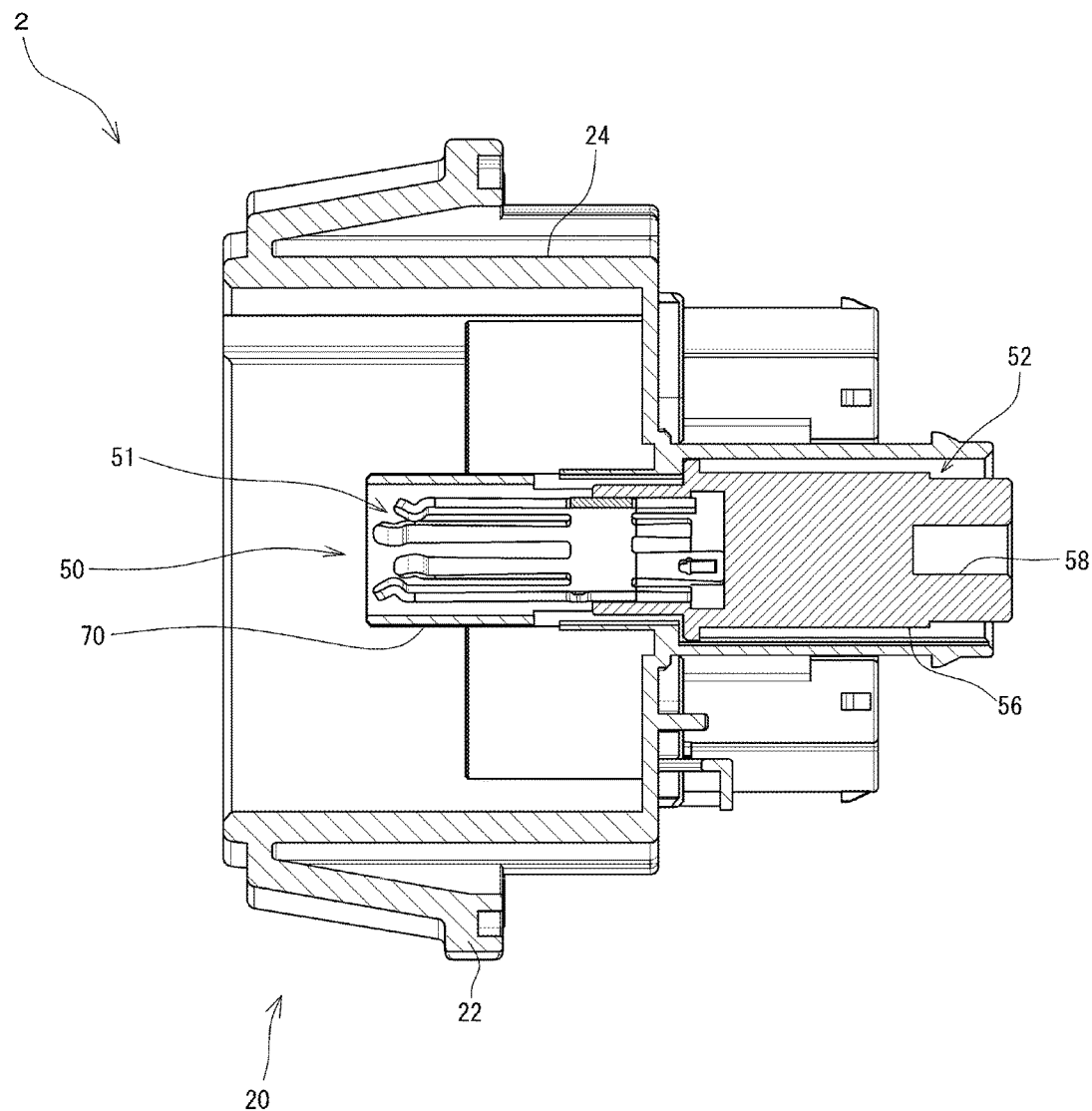
FIG. 6 is a cross-sectional view taken along line B-B of FIG. 5.

As shown in FIGS. 1 to 6, the charging connector 2 according to the present embodiment has power sockets 10, into which power terminals (not shown) of the charging plug are fitted, signal line sockets 12, into which signal terminals (not shown) of the charging plug are fitted, a housing 20, a cover member 30 attached to the housing 20 (see FIG. 5), and a locking mechanism 40 for locking the cover member 30 at a predetermined position (closed position) (see FIG. 5). In FIGS. 1 to 4, for the sake of clarity, the cover member 30 and the locking mechanism 40 are omitted from the illustration.

The housing 20 includes a plate portion 22 in the form of a generally rectangular plate, a cylindrical socket receptacle portion 24 that houses the power sockets 10 and the signal line sockets 12, cover member attachment portions 26A and 26B to which the cover member 30 is rotatably attached so as to open and close an opening of the socket receptacle portion 24, and locking mechanism attachment portions 28A and 28B to which the locking mechanism 40 is attached so as to maintain the closed position of the cover member 30. The socket receptacle portion 24 is provided so as to extend through a central region of the plate portion 22. Fixation holes 14 are formed at four corners of the plate portion 22. Screws or the like are inserted into the fixation holes when the charging connector 2 is attached to the vehicle body.

As shown in FIG. 5, the power sockets 10 include a plurality of cylindrical socket portions 70 formed integrally with the housing 20, a seal member 72 attached around the socket portions 70, a housing cap 74 secured to tips of the socket portions 70 so as to cover front openings of the socket portions 70. A terminal receptacle portion 71 is formed at a radially inner side of each of the socket portions 70 so as to receive a connection terminal 50, which can electrically be connected to a power terminal (not shown) of the charging plug. In FIGS. 1 and 6, for the sake of clarity, the seal member 72 and the housing cap 74 are omitted from the illustration.

The seal member 72 ensures the waterproof property when the power terminals of the charging plug is fitted to the power sockets 10. For example, the seal member 72 is formed of an elastic material such as silicone rubber. The housing cap 74 is formed of a resin or the like and secured to the socket portions 70 by a hook or the like (not shown). The seal member 72 is also secured to the socket portions 70 by the housing cap 74 secured to the socket portions 70. Insertion holes 74A are formed in the front face at a central portion of the housing cap 74 such that the power terminals of the charging plug are inserted through the insertion holes 74A.

Figure 7:
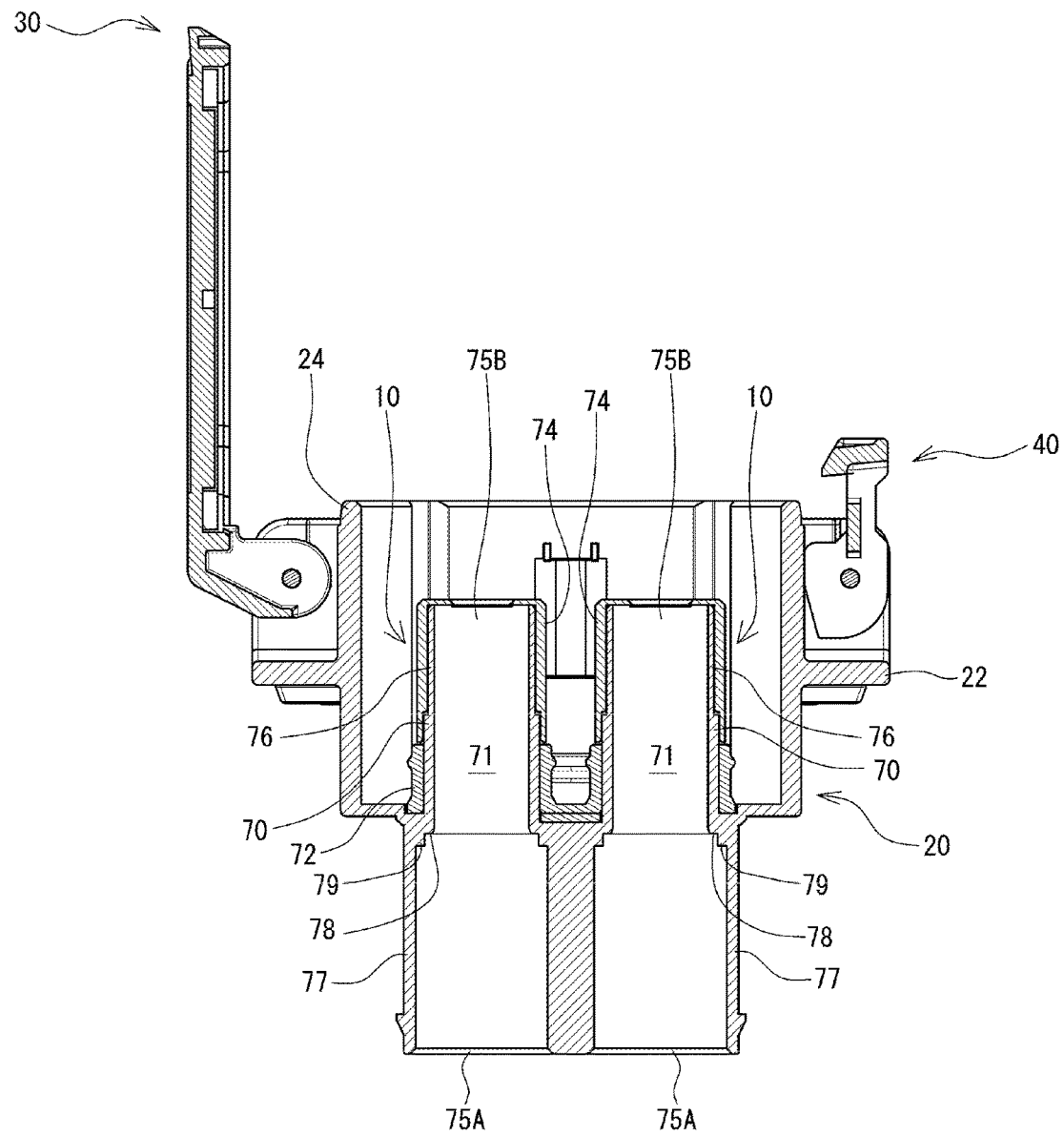
FIG. 7 is a view showing a state in which connection terminals have been removed from the cross-sectional view of FIG. 5.
Figure 8:
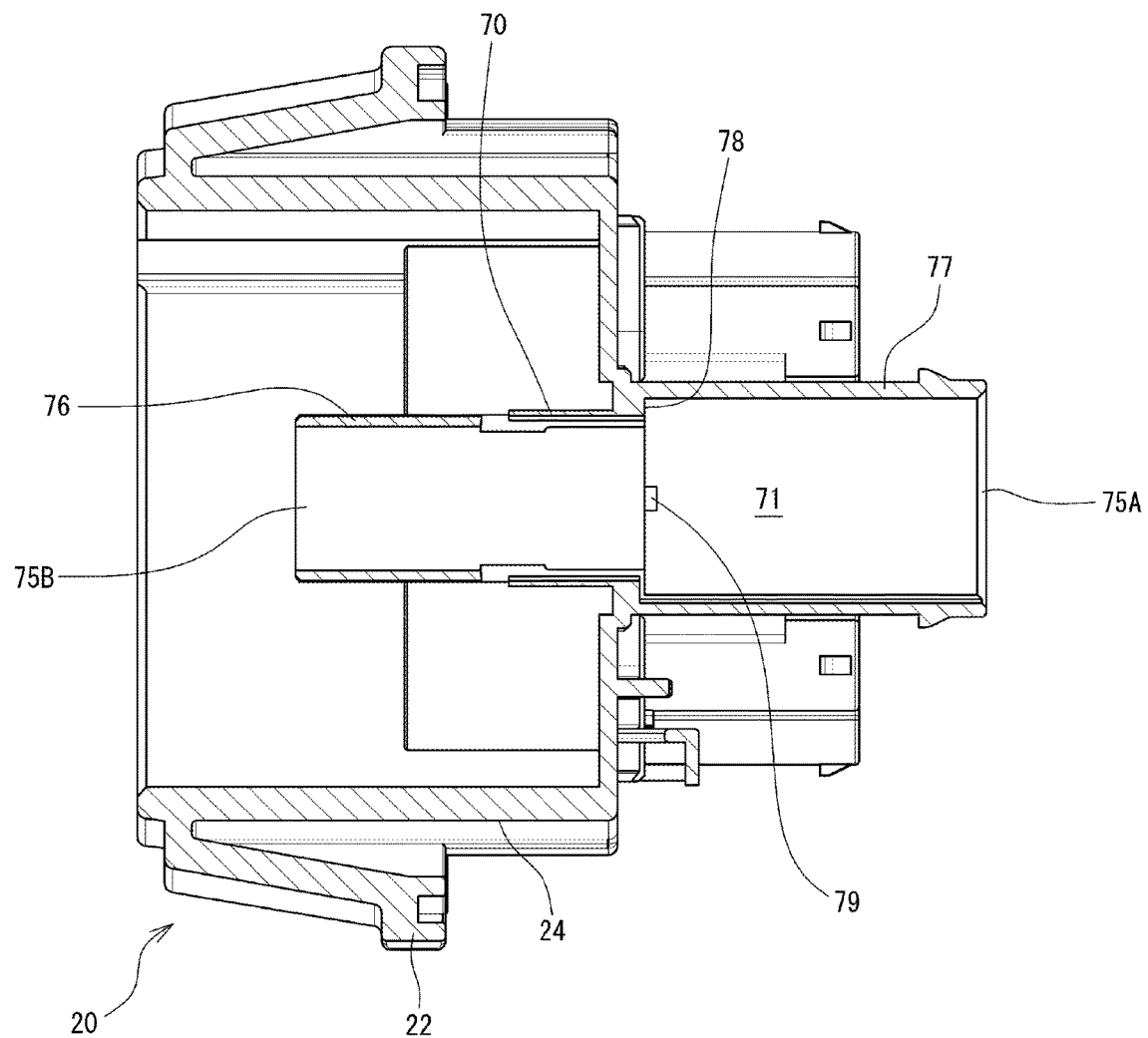
FIG. 8 is a view showing a state in which the connection terminals have been removed from the cross-sectional view of FIG. 6.

FIG. 7 is a view showing a state in which the connection terminals 50 have been removed from the cross-sectional view of FIG. 5. FIG. 8 is a view showing a state in which the connection terminals 50 have been removed from the cross-sectional view of FIG. 6. As shown in FIGS. 7 and 8, each of the terminal receptacle portions 71 of the power sockets 10 extends along an axial direction of the socket portion 70 so as to penetrate an interior of the socket portion 70. An electric cable side opening 75A, which communicates with the terminal receptacle portion 71, is formed at a side (rear side) of the socket portion 70 to which the electric power cable 60 is to be connected. A charging plug side opening 75B, which communicates with the terminal receptacle portion 71, is formed at a side (front side) of the socket portion 70 to which the charging plug is to be connected.

Furthermore, the diameter of the terminal receptacle portion 71 at the (front) side to which the charging plug is to be connected is smaller than the diameter of the terminal receptacle portion 71 at the (rear) side to which the electric power cable 60 is to be connected. Thus, a smaller-diameter portion 76 is formed at the side of the charging plug, and a larger-diameter portion 77 is formed at the side of the electric cable. Therefore, a stepped surface 78 is formed at an interface between the smaller-diameter portion 76 and the larger-diameter portion 77.

Figure 9:
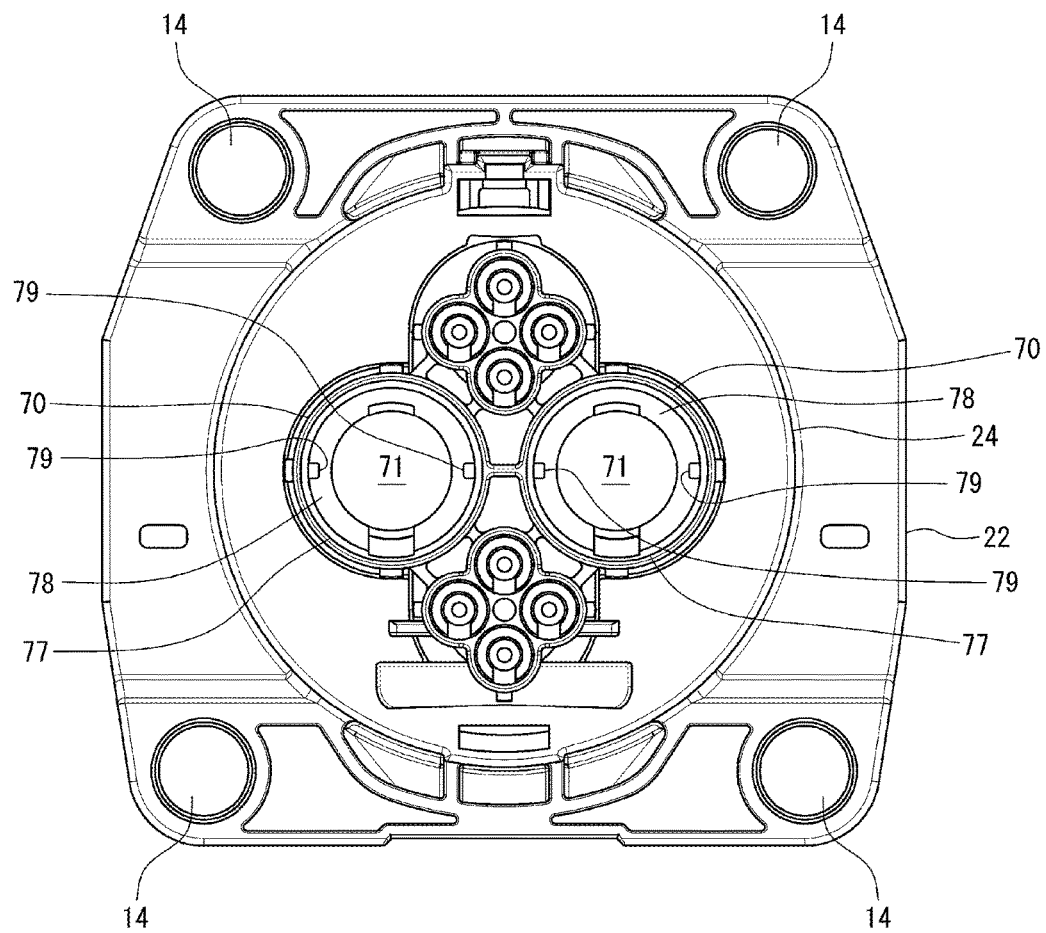
FIG. 9 is a rear view of FIG. 8.

FIG. 9 is a rear view of FIG. 8. As shown in FIGS. 7 to 9, engagement projections (socket engagement portions) 79 are formed at the larger-diameter portion 77 of each of the terminal receptacle portions 71 so as to project from the stepped surface 78 in the axial direction. In the present embodiment, two engagement projections 79 are formed at positions horizontally opposed to each other with the axis of the socket portion 70 being interposed therebetween. The number of the engagement projections 79 is not limited to the illustrated example. One engagement projection 79 may be formed for each of the terminal receptacle portions 71. Alternatively, three or more engagement projections 79 may be formed for each of the terminal receptacle portions 71.

Figure 10:
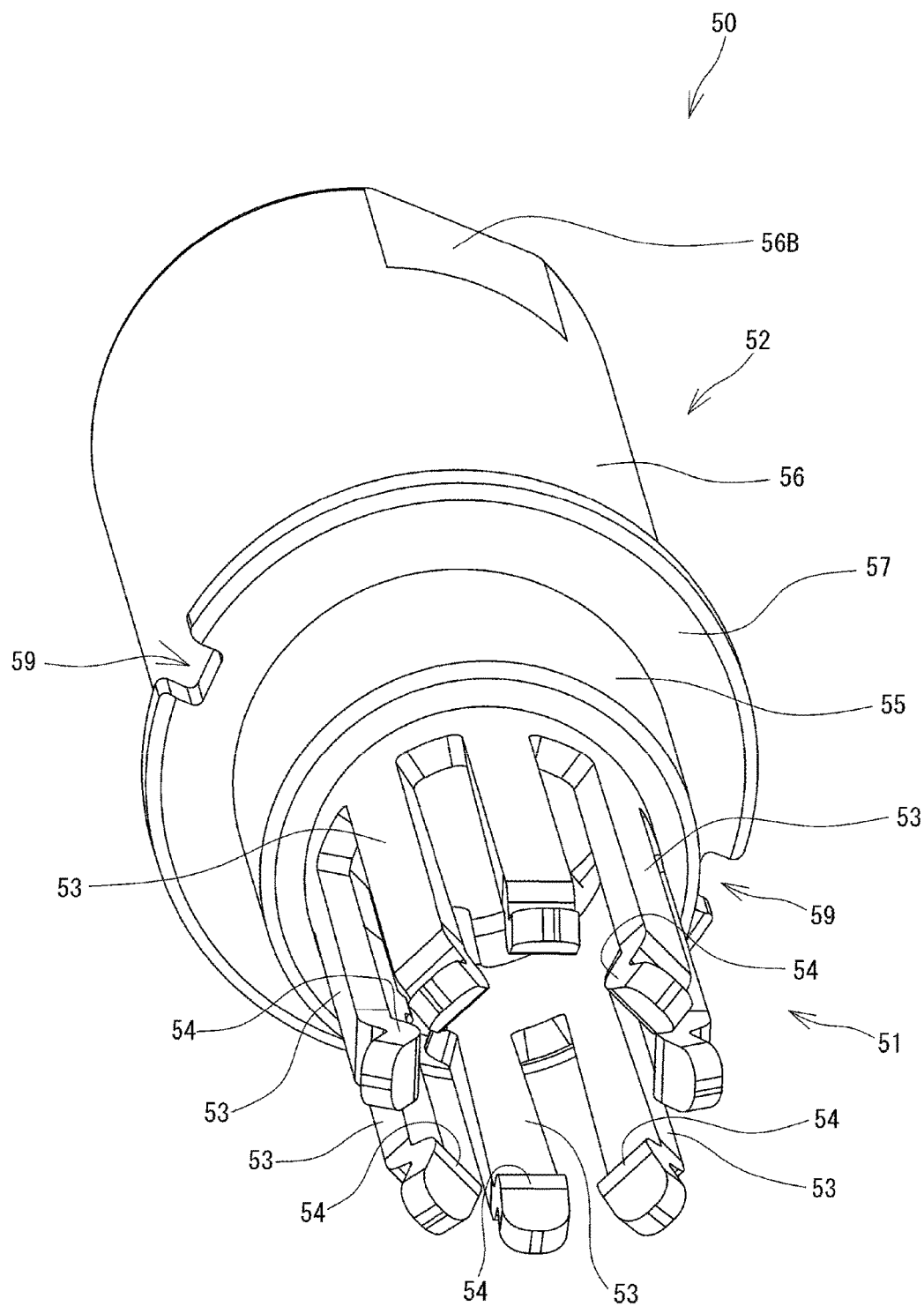
FIG. 10 is a perspective view showing a connection terminal of the charging connector assembly shown in FIG. 1.
Figure 11:
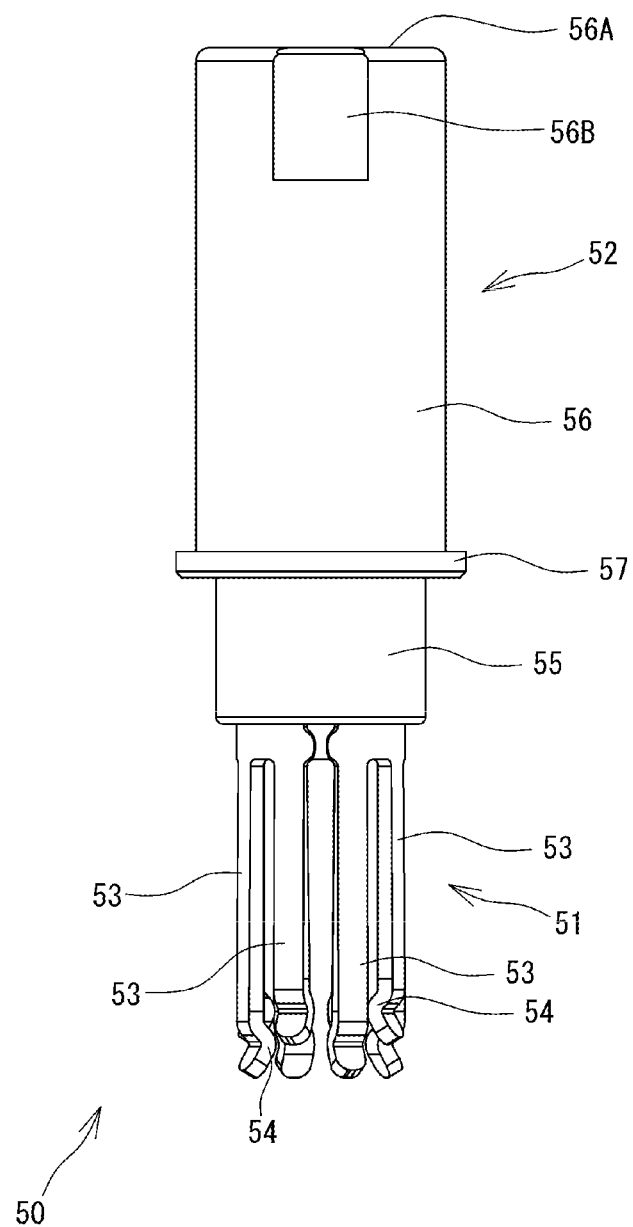
FIG. 11 is a plan view of the connection terminal shown in FIG. 10.
Figure 12:
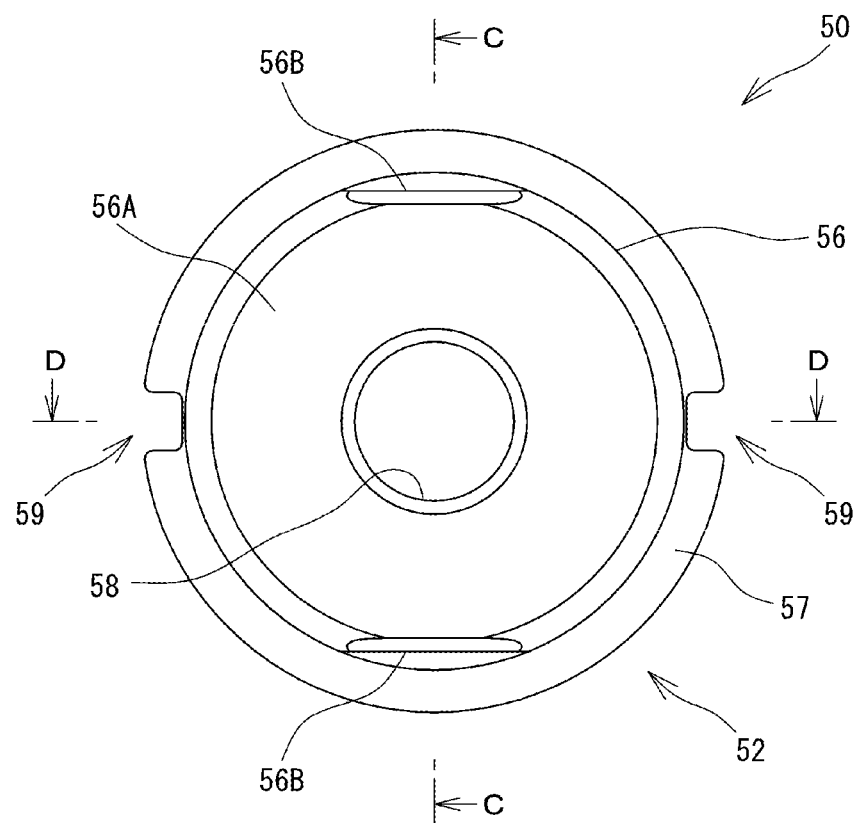
FIG. 12 is a rear view of the connection terminal shown in FIG. 10.
Figure 13:
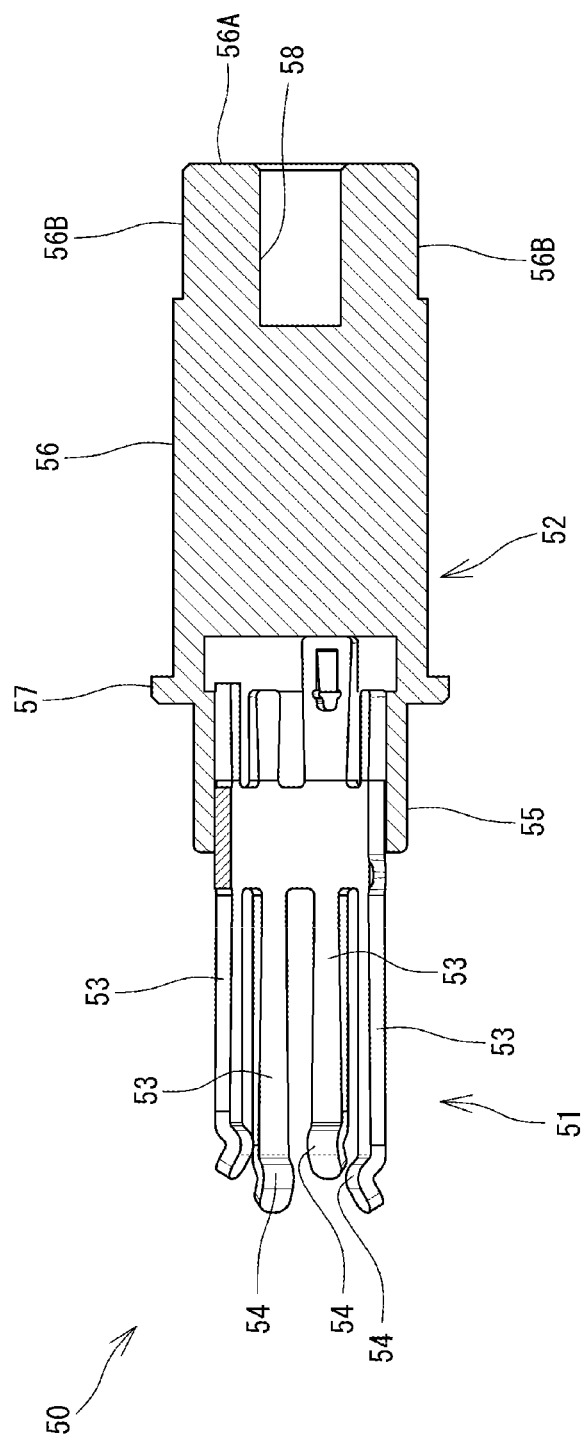
FIG. 13 is a cross-sectional view taken along line C-C of FIG. 12.
Figure 14:
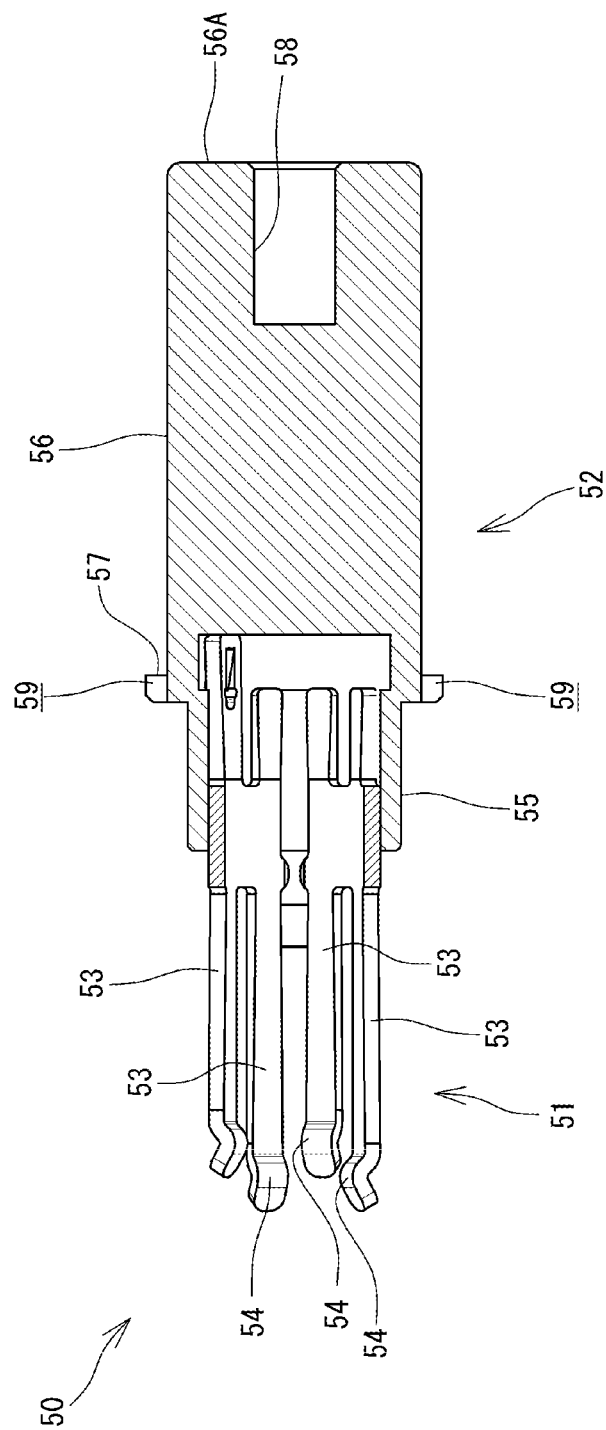
FIG. 14 is a cross-sectional view taken along line D-D of FIG. 12.

Next, the connection terminal 50 will be described with reference to FIGS. 10 to 14. FIG. 10 is a perspective view showing the connection terminal 50, FIG. 11 is a plan view thereof, FIG. 12 is a rear view thereof, FIG. 13 is a cross-sectional view taken along line C-C, and FIG. 14 is a cross-sectional view taken along line D-D.

As shown in FIGS. 10 to 14, the substantially cylindrical connection terminal 50 includes a plug connection portion 51 that can electrically be connected to the rod-like power terminal (not shown) of the charging plug and a generally cylindrical terminal coupling portion 52 located at an opposite side of the plug connection portion 51 in the axial direction. The plug connection portion 51 and the terminal coupling portion 52 of the connection terminal 50 are formed of an electrically conductive material. Thus, the plug connection portion 51 and the terminal coupling portion 52 of the connection terminal 50 can electrically connect the power terminal of the charging plug connected to the plug connection portion 51 and the fixture terminal 80 connected to the terminal coupling portion 52 to each other.

The plug connection portion 51 of the connection terminal 50 has a plurality of contact pieces 53 in the form of an elongate plate extending along the axial direction. A tip of each of the contact pieces 53 is a free end. Thus, each of the contact pieces 53 is bent when it receives a certain amount of force. The plurality of contact pieces 53 are arranged at predetermined intervals along a circumferential direction of the connection terminal 50. The power terminal of the charging plug is inserted into a space surrounded by those contact pieces 53. When the charging plug is connected to the charging connector 2, the respective contact pieces 53 is brought into elastic contact with an outer circumferential surface of the power terminal. Therefore, the power terminal of the charging plug and the connection terminal 50 are electrically connected to each other, so that the power terminal of the charging plug is electrically connected to the electric power cable 60 via the fixture terminal 80 connected to the terminal coupling portion 52 of the connection terminal 50. Thus, a secondary cell is electrically charged.

Furthermore, the plurality of contact pieces 53 extends as a whole along the axial direction. Each of the contact pieces 53 has a curved portion 54 curved radially inward in the vicinity of a tip of the contact piece 53. Therefore, the distance between the contact pieces 53 opposed to each other is shortest at the curved portions 54. The distance between the curved portions 54 of the opposed contact pieces 53 is designed to be less than the diameter of the power terminal of the charging plug. Accordingly, the power terminal of the charging plug is fitted into the power socket 10. When the rod-like power terminal is inserted into a space surrounded by the contact pieces 53, the curved portions 54 of the respective contact pieces 53 are brought into elastic contact with an outer circumferential surface of the power terminal. Thus, a good electrical connection can be established between the power terminal and the connection terminal 50.

The terminal coupling portion 52 of the connection terminal 50 has a cylindrical holder portion 55 for holding base portions of the respective contact pieces 53, a substantially cylindrical base portion 56 to which the fixture terminal 80 is connected, and a flange portion 57 projecting radially outward between the holder portion 55 and the base portion 56. As shown in FIGS. 12 to 14, a bolt hole 58 in which a bolt 90 (see FIG. 2) for fixing the fixture terminal 80 is screwed is formed in a rear end face 56A of the base portion 56 of the terminal coupling portion 52. A female screw is threaded in an inner circumferential surface of the bolt hole 58. The rear end face 56A of the base portion 56 is perpendicular to the axial direction of the connection terminal 50 and serves as an attachment surface with which the fixture terminal 80 is brought into contact when the fixture terminal 80 is secured to the connection terminal 50.

When the connection terminal 50 is accommodated in the terminal receptacle portion 71 of the power socket 10, the flange portion 57 of the terminal coupling portion 52 is brought into abutment against the stepped surface 78 formed in the terminal receptacle portion 71 (see FIGS. 7 to 9) to thus position the connection terminal 50 within the terminal receptacle portion 71 in the axial direction, as described below.

As shown in FIGS. 10 to 13, engagement grooves (terminal engagement portions) 59 are formed in the flange portion 57 of the terminal coupling portion 52 so as to correspond to the aforementioned engagement projections 79 of the terminal receptacle portion 71. In the present embodiment, two engagement grooves 59 are formed at locations that are symmetrical to each other with respect to the axis of the connection terminal 50. The dimension of those engagement grooves 59 is greater than the dimension of the engagement projections 79 of the terminal receptacle portion 71. When the connection terminal 50 is accommodated in the terminal receptacle portion 71, the engagement projections 79 of the terminal receptacle portion 71 are engaged with the engagement grooves 59 of the flange portion 57 to align and fix the connection terminal 50 in the circumferential direction within the terminal receptacle portion 71. Specifically, the engagement projections 79 of the terminal receptacle portion 71 and the engagement grooves 59 of the flange portion 57 serve as a rotation regulator structure operable to regulate the rotation of the connection terminal 50 about its axis with respect to the socket portion 70 by engagement of the engagement projections 79 of the terminal receptacle portion 71 and the engagement grooves 59 of the flange portion 57.

Furthermore, as shown in FIGS. 10 to 14, flat surfaces 56B extending to the rear end face 56A are formed on an outer circumference of the base portion 56 of the terminal coupling portion 52. In the present embodiment, two flat surfaces 56B are formed at locations that are symmetrical to each other with respect to the axis of the connection terminal 50.

Figure 15:
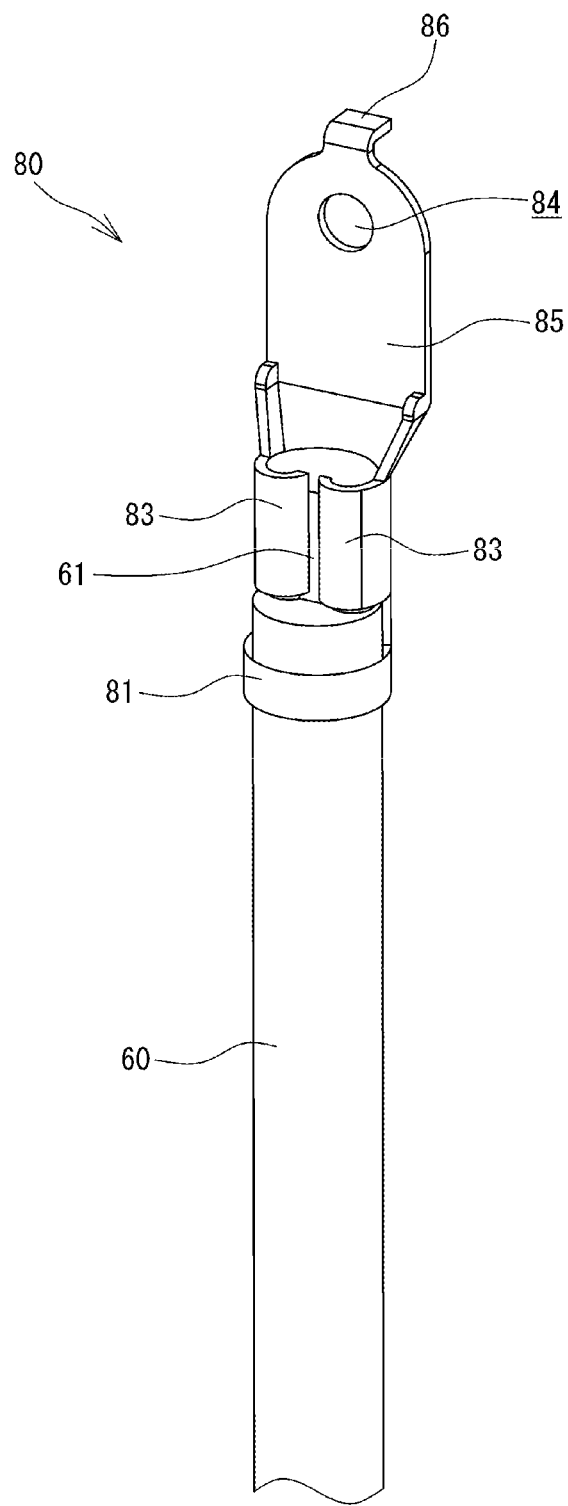
FIG. 15 is a perspective view showing an electric power cable and a fixture terminal of the charging connector assembly shown in FIG. 1.
Figure 16:
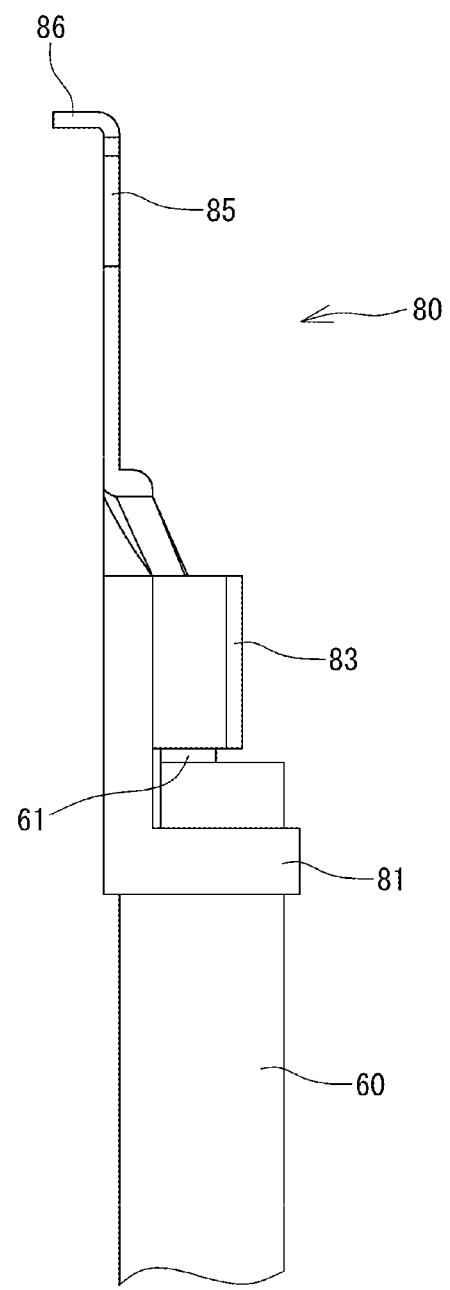
FIG. 16 is a right side view of the electric cable and the fixture terminal shown in FIG. 15.

Now the fixture terminal 80 for connecting the electric power cable 60 to the aforementioned terminal coupling portion 52 of the connection terminal 50 will be described with reference to FIGS. 15 and 16. FIG. 15 is a perspective view showing the electric power cable 60 and the fixture terminal 80 that is attached to the electric power cable 60, and FIG. 16 is a right side view thereof.

As shown in FIG. 15, the fixture terminal 80 has a cylindrical electric cable holder portion 81 for allowing the electric power cable 60 to pass therethrough and holding the electric power cable 60, electric cable fixing pieces 83 for crimping and fixing a core wire 61 exposed by removing a cover material of the electric power cable 60, a flat plate portion 85 in which an insertion hole 84 is formed, and an engagement piece 86 extending perpendicular to the flat plate portion 85 from an end of the flat plate portion 85. The fixture terminal 80 is formed of an electrically conductive material. The fixture terminal 80 is electrically connected to the core wire 61 of the electric power cable 60 at the crimped electric cable fixing pieces 83.

As described below, a bolt 90 as a fastener for fixing the electric power cable 60 is inserted through the insertion hole 84 in the flat plate portion 85 of the fixture terminal 80. A male screw of the bolt 90 is threaded into the female screw of the bolt hole (fastening hole) 58 of the connection terminal 50 to thereby secure the fixture terminal 80 to the connection terminal 50. Thus, the fixture terminal 80 is secured to the connection terminal 50, so that the core wire 61 of the electric power cable 60 and the connection terminal 50 are electrically connected to each other.

Now a method of manufacturing a charging connector assembly 1 according to the present embodiment will be described with reference to FIGS. 17A to 19. FIGS. 17A to 17E are cross-sectional views explanatory of a manufacturing method of a charging connector assembly 1.

Figure 17A:
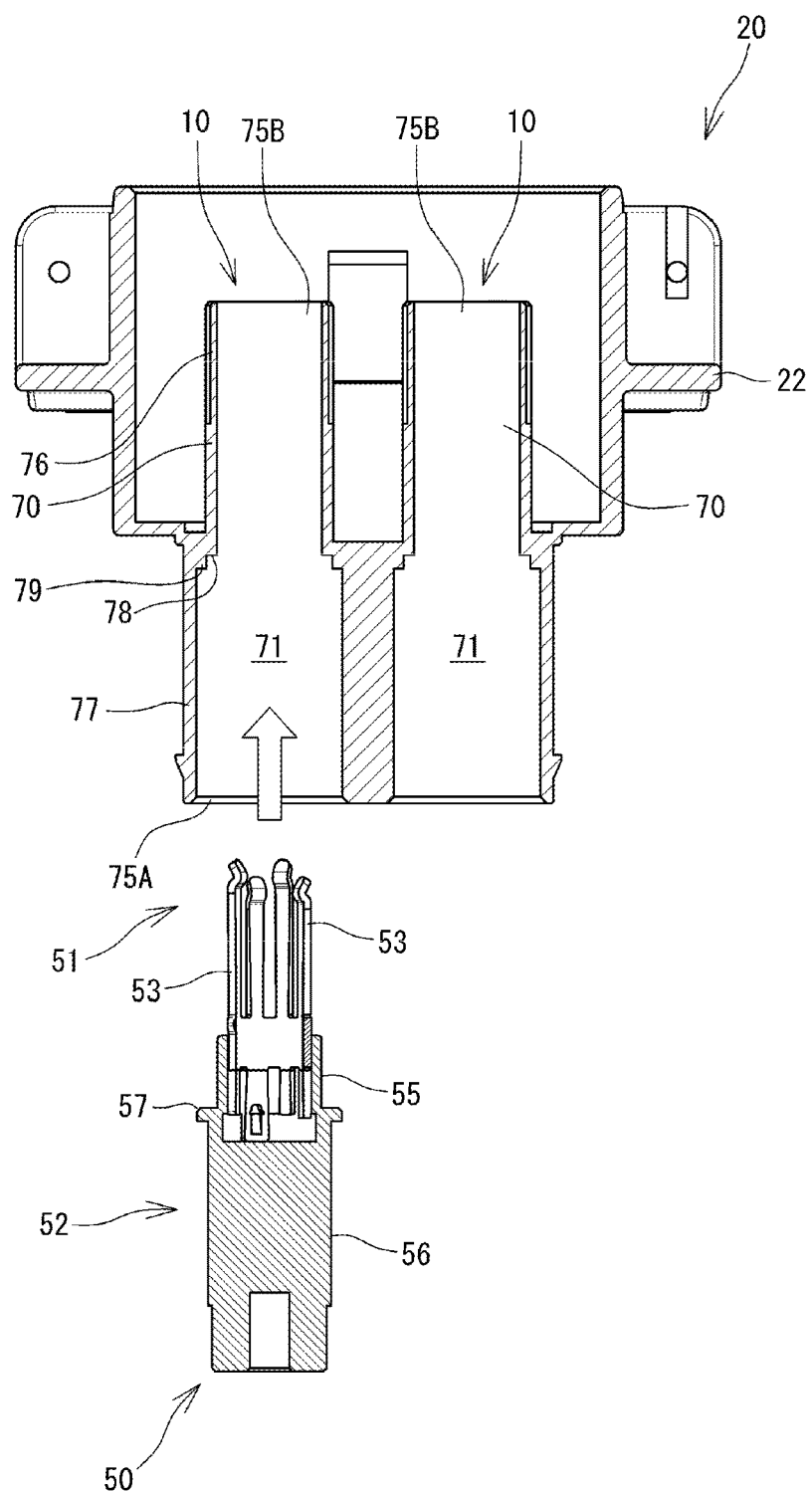
FIG. 17A is a cross-sectional view explanatory of a manufacturing process of the charging connector assembly shown in FIG. 1.

First, as shown in FIG. 17A, the aforementioned housing 20 is prepared and attached to a location at which the charging connector 2 should be arranged, such as a side portion of a vehicle body. Then the aforementioned connection terminal 50 is prepared. The plug connection portion 51 of this connection terminal 50 is directed to the terminal receptacle portion 71 of the socket portion 70, and the connection terminal 50 is inserted into the terminal receptacle portion 71 of the socket portion 70 from the electric cable side opening 75A.

Figure 18A:
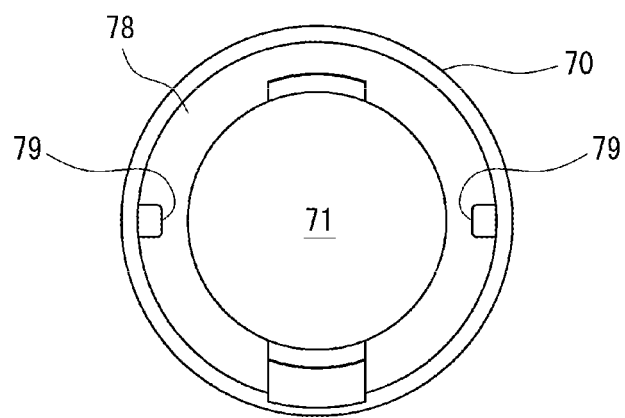
FIG. 18A is a schematic view explanatory of an insertion method of the connection terminal in a manufacturing process of the charging connector assembly shown in FIG. 1.
Figure 18A:
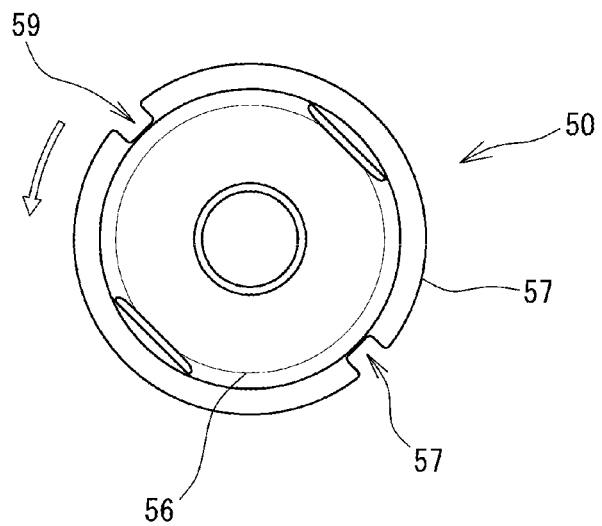
Figure 18B:
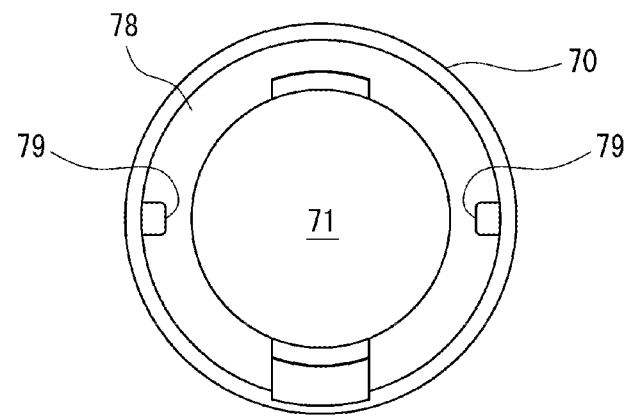
FIG. 18B is a schematic view explanatory of an insertion method of the connection terminal in a manufacturing process of the charging connector assembly shown in FIG. 1.
Figure 18B:
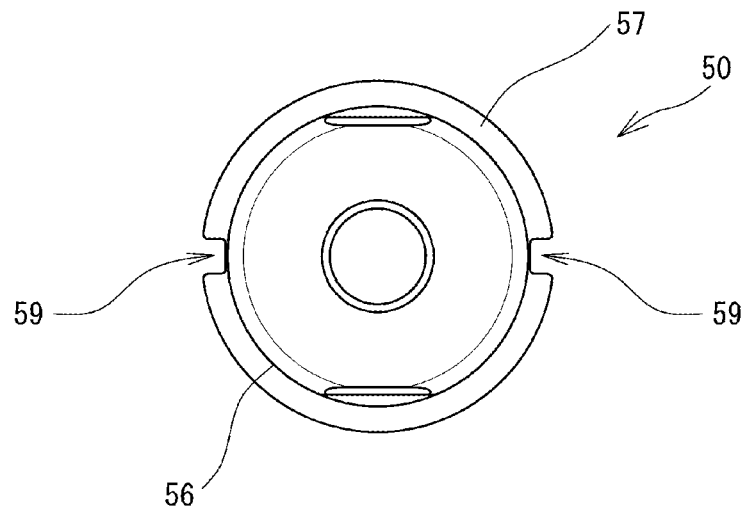

If the engagement grooves 59 of the connection terminal 50 and the engagement projections 79 of the socket portion 70 are not positionally aligned with each other as shown in FIG. 18A, then the flange portion 57 of the connection terminal 50 strikes the engagement projections 79 of the socket portion 70 during the insertion of the connection terminal 50 into the terminal receptacle portion 71. Thus, the connection terminal 50 cannot satisfactorily be accommodated into the terminal receptacle portion 71. As shown in FIG. 18B, therefore, the connection terminal 50 is rotated about its axis so that the engagement grooves 59 of the connection terminal 50 are aligned with the engagement projections 79 of the socket portion 70. In this state, the connection terminal 50 is inserted into the terminal receptacle portion 71.

The two engagement grooves 59 of the connection terminal 50 are formed at locations that are symmetrical to each other with respect to the axis of the connection terminal 50, and the two engagement projections 79 of the socket portion 70 are formed at locations that are symmetrical to each other with respect to the axis of the socket portion 70. Therefore, if either one of the engagement projections 79 is engaged with the corresponding engagement groove 59, the other engagement projection 79 is engaged with the corresponding engagement groove 59. Accordingly, alignment of the connection terminal 50 about its axis is facilitated. Only either the engagement grooves 59 or the engagement projections 79 may be provided at locations that are symmetrical to each other with respect to the axis of the corresponding connection terminal 50 or socket portion 70. The number of the engagement grooves 59 and the number of the engagement projections 79 are not limited to the illustrated examples.

Figure 17B:
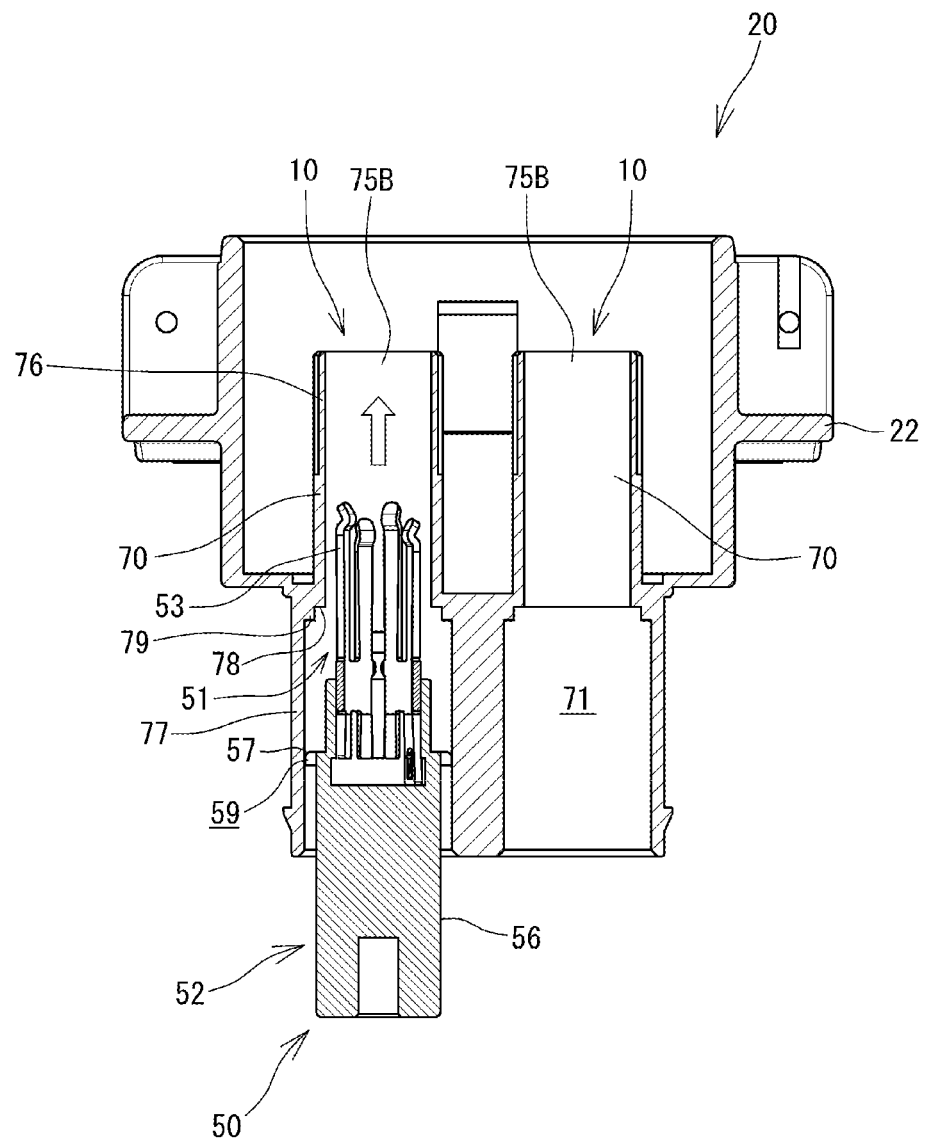
FIG. 17B is a cross-sectional view explanatory of a manufacturing process of the charging connector assembly shown in FIG. 1.
Figure 17C:
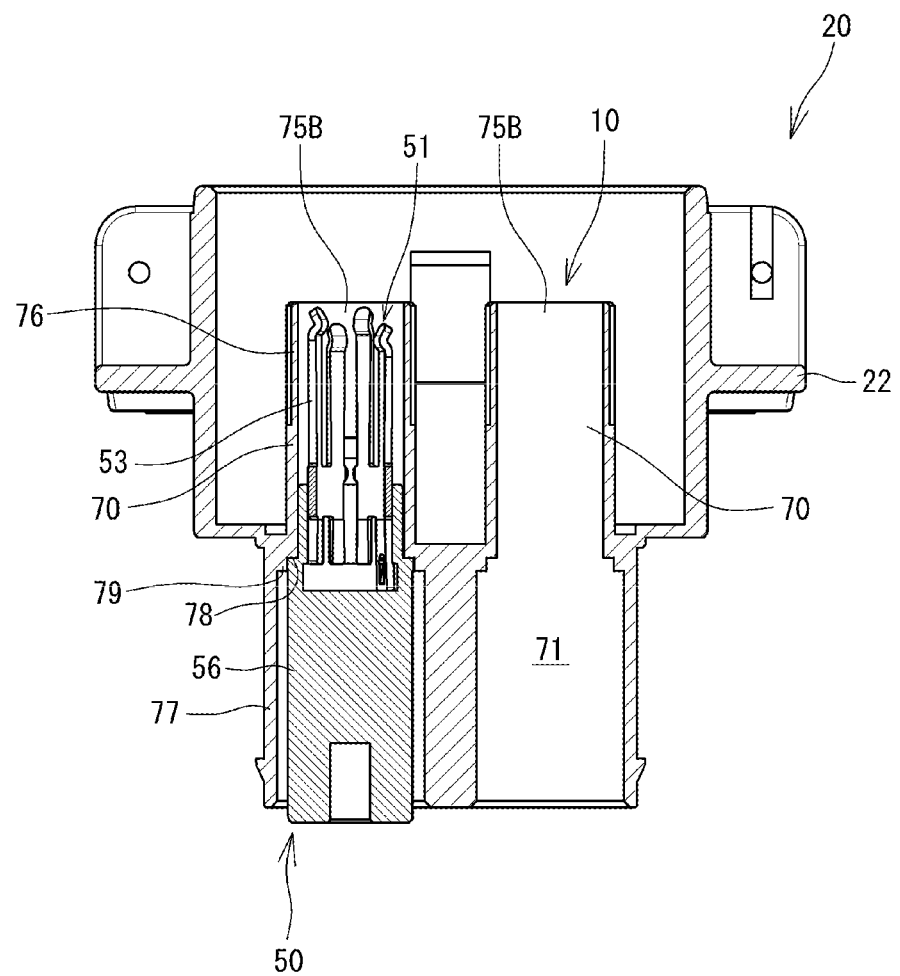
FIG. 17C is a cross-sectional view explanatory of a manufacturing process of the charging connector assembly shown in FIG. 1.

Then, as shown in FIG. 17B, tips of the contact pieces 53 of the connection terminal 50 are introduced from the larger-diameter portion 77 to the smaller-diameter portion 76 of the terminal receptacle portion 71. As shown in FIG. 17C, the connection terminal 50 is inserted into the terminal receptacle portion 71 until the flange portion 57 of the terminal coupling portion 52 of the connection terminal 50 is brought into abutment against the stepped surface 78 of the terminal receptacle portion 71. At that time, the engagement projections 79 of the socket portion 70 are brought into engagement with the engagement grooves 59 of the connection terminal 50. Thus, the positioning of the connection terminal 50 within the terminal receptacle portion 71 in the axial direction can be achieved by bringing the flange portion 57 of the terminal coupling portion 52 into abutment against the stepped surface 78 of the terminal receptacle portion 71. As a result, the plug connection portion 51 of the connection terminal 50 is accommodated in the smaller-diameter portion 76 of the terminal receptacle portion 71, and the base portion 56 of the terminal coupling portion 52 is accommodated in the larger-diameter portion 77.

Figure 17D:
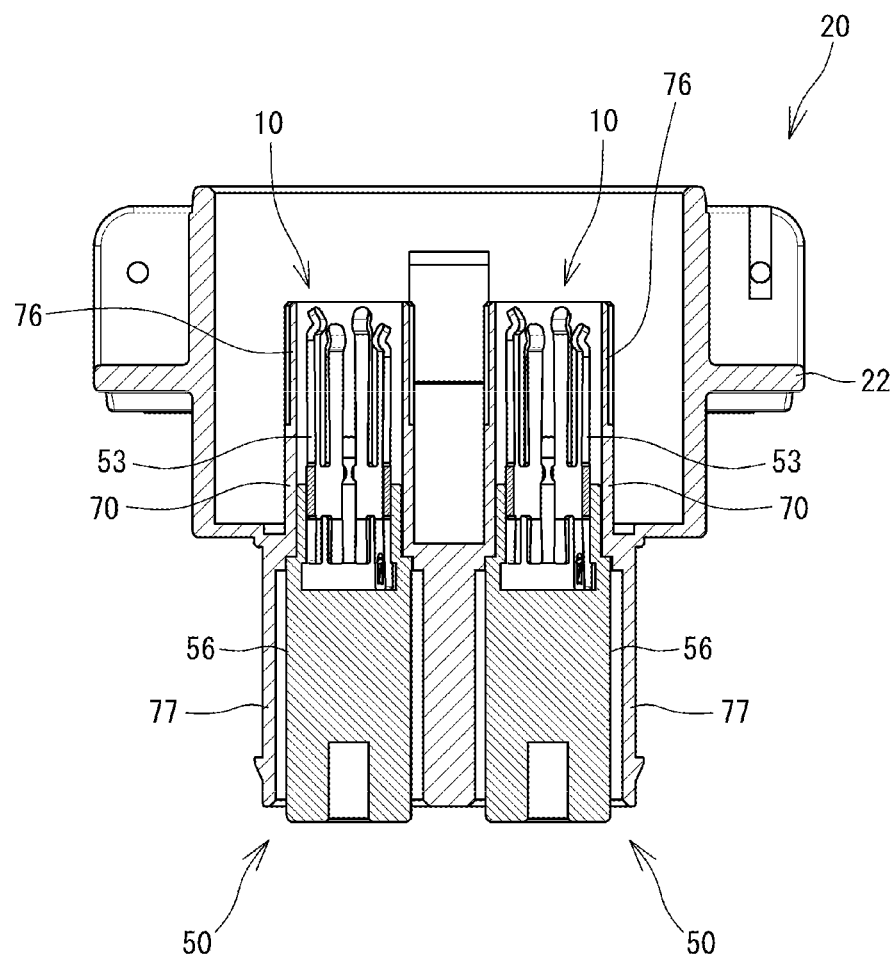
FIG. 17D is a cross-sectional view explanatory of a manufacturing process of the charging connector assembly shown in FIG. 1.
Figure 17E:
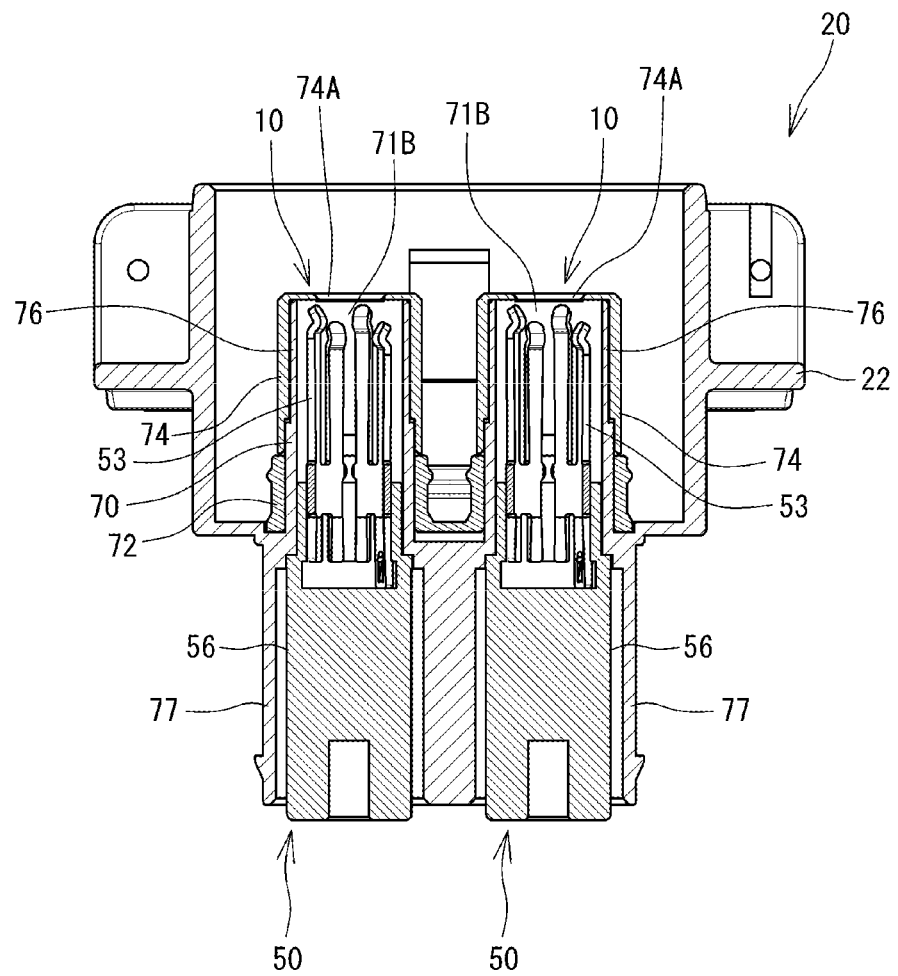
FIG. 17E is a cross-sectional view explanatory of a manufacturing process of the charging connector assembly shown in FIG. 1.

Similarly, a second connection terminal 50 is also inserted into the terminal receptacle portion 71 of the socket portion 70 (FIG. 17D). Then a seal member 72 is disposed around the socket portions 70, and a housing cap 74 is attached to the socket portions 70 (FIG. 17E). Thus, the charging plug side opening 75B of the terminal receptacle portion 71 is covered with the housing cap 74, which has insertion holes 74A. The diameter of each of the insertion holes 74A of the housing cap 74 is smaller than the diameter of the charging plug side opening 75B of the socket portion 70. Therefore, when the power terminal of the charging plug is fitted into the power socket 10 to connect the power terminal to the connection terminal 50 accommodated in the terminal receptacle portion 71 of the socket portion 70, insertion of the power terminal is guided by the insertion hole 74A, so that the plug connection portion 51 (contact pieces 53) of the connection terminal 50 can be protected.

Since the housing cap 74 is thus attached over the charging plug side opening 75B, the power terminals provided on the charging plug can be inserted through the insertion holes 74A, which have a smaller diameter than the diameter of the charging plug side openings 75B, upon connection of the charging plug and the charging connector 2. Accordingly, even if the power terminals are inserted obliquely into the terminal receptacle portions 71 upon connection of the charging plug and the charging connector 2, the guidance by the insertion holes 74A, which have a smaller diameter than the diameter of the charging plug side openings 75B, allows the power terminals to be inserted into the center of a plurality of contact pieces 53 of the connection terminal 50. Consequently, the power terminals are prevented from striking a plurality of contact pieces 53 of the connection terminal 50 in unintentional directions, so that the contact pieces 53 of the connection terminals 50 accommodated in the terminal receptacle portions 71 can be protected.

Next, an electric power cable 60 having a fixture terminal 80 attached thereto is prepared. A fixture terminal 80 is attached to an end of the electric power cable 60 in the following manner. First, a cover material of the electric power cable 60 is removed at an end of the electric power cable 60 to expose a core wire 61 to an outside of the electric power cable 60. The exposed core wire 61 is inserted into a gap formed between the electric cable fixing pieces 83 and the flat plate portion 85 of the fixture terminal 80. The electric cable fixing pieces 83 are pressed and crimped. Thus, the electric power cable 60 with the fixture terminal 80 as shown in FIG. 15 is completed.

Figure 19:
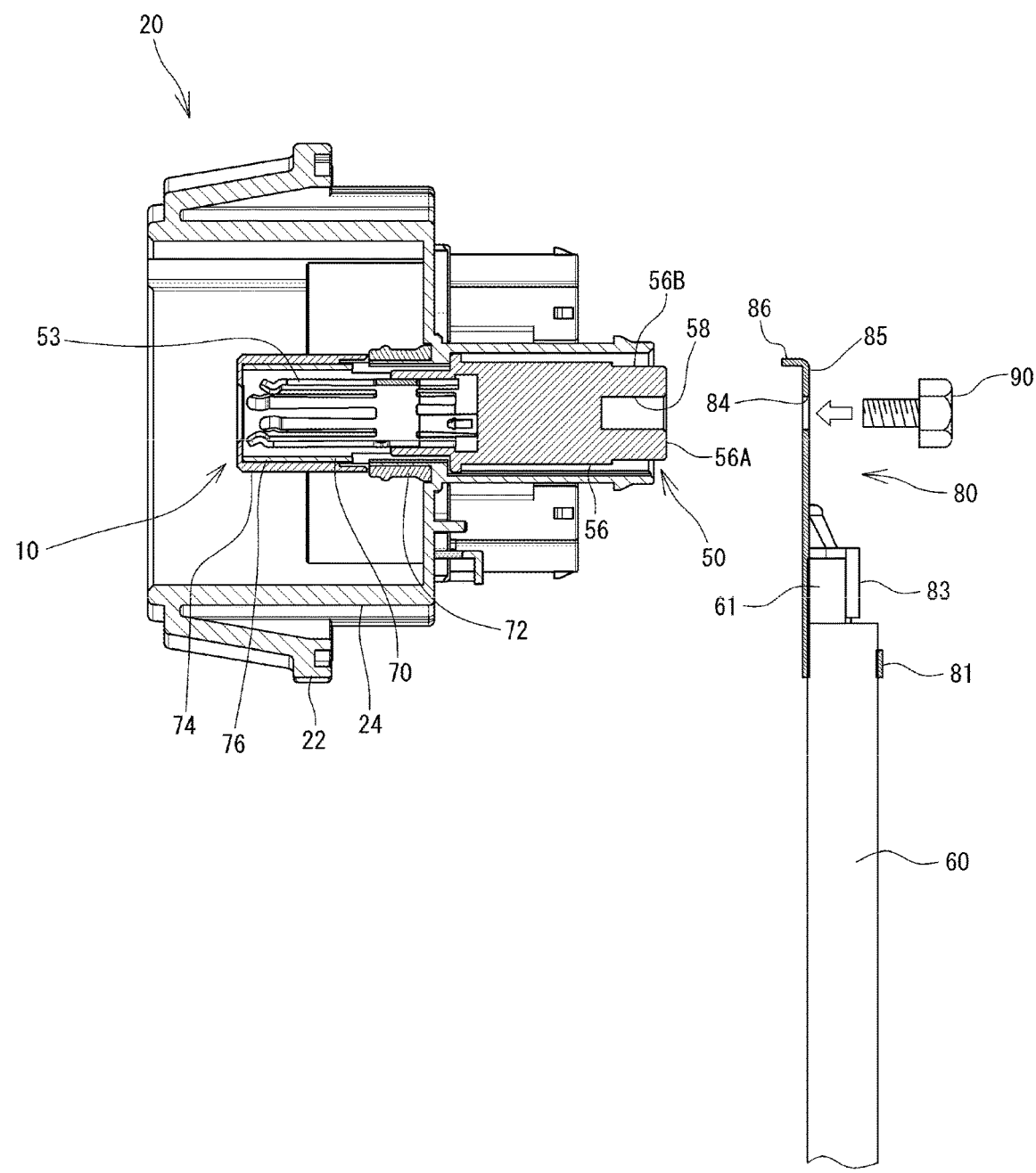
FIG. 19 is a cross-sectional view explanatory of a manufacturing process of the charging connector assembly shown in FIG. 1.

Then, as shown in FIG. 19, a bolt 90 is inserted into the insertion hole 84 of the fixture terminal 80 to which the core wire 61 of the electric power cable 60 has been fixed. The flat plate portion 85 of the fixture terminal 80 is opposed to the rear end face 56A of the base portion 56 of the connection terminal 50. The male screw of the bolt 90 is threaded into the female screw of the bolt hole 58 of the connection terminal 50 that has been accommodated in the terminal receptacle portion 71 of the socket portion 70. Thus, the fixture terminal 80 is secured to the connection terminal 50 in a state in which the flat plate portion 85 of the fixture terminal 80 is in contact with the rear end face 56A of the connection terminal 50. At that time, a force is applied to the connection terminal 50 about the axis of the connection terminal 50 when the bolt 90 is screwed. Since the engagement projections 79 of the socket portion 70 are engaged with the engagement grooves 59 of the connection terminal 50 as described above, the bolt 90 can be fastened without rotation of the connection terminal 50 within the terminal receptacle portion 71. In this manner, the core wire 61 of the electric power cable 60 can be connected to the connection terminal 50 via the fixture terminal 80. The electric signal cable 62 is connected to the charging connector 2 in the conventional manner, which is not illustrated.

With the aforementioned processes, a charging connector assembly 1 as shown in FIG. 2 can be manufactured. Thus, in the present embodiment, while the connection terminals 50 are first accommodated in the terminal receptacle portions 71 of the socket portions 70, the electric power cables 60 can be connected to the connection terminals 50 via the fixture terminals 80. Therefore, the connection terminals 50 and the core wires 61 of the electric power cables 60 can electrically be connected to each other without excessive forces applied to the connection terminals 50. Accordingly, it is possible to prevent any contact failure resulting from cracks between the connection terminals 50 and the core wires 61 of the electric power cables 60. Furthermore, the electric power cables 60 can flexibly be routed without various restrictions imposed on insertion of the connection terminals 50 into the terminal receptacle portions 71. Therefore, a routing operation of the electric power cables 60 is greatly facilitated.

Meanwhile, in automobiles having an internal combustion engine, such as hybrid vehicles, the fixture terminal 80 may be rotated with respect to the connection terminal 50 due to vibration caused by the internal combustion engine. Thus, the bolt 90 may be loosened to cause insufficient electrical connection between the fixture terminal 80 and the connection terminal 50. Accordingly, in the present embodiment, when the fixture terminal 80 is secured to the connection terminal 50, the engagement piece 86, which is provided on the upper end of the fixture terminal 80, is located on the flat surface (engagement surface) 56B formed on the base portion 56 of the connection terminal 50. In this state, the fixture terminal 80 is secured to the connection terminal 50. In this manner, even if any vibration is transmitted from the internal combustion engine to the fixture terminal 80, the fixture terminal 80 does not rotate with respect to the connection terminal 50 because the fixture terminal 80 is engaged with the flat surface (engagement surface) 56B of the connection terminal 50 via the engagement piece 86. Thus, the bolt 90 is not loosened. Accordingly, good electrical connection can be maintained between the fixture terminal 80 and the connection terminal 50.

In the aforementioned embodiment, the engagement projections 79 are formed on the socket portion 70 of the housing 20, and the engagement grooves 59 are formed in the flange portion 57 of the connection terminal 50. However, an engagement projection projecting radially outward may be formed at any location of the connection terminal 50, and an engagement groove (socket engagement portion) corresponding to the engagement projection may be formed in the terminal receptacle portion 71 of the housing 20. Furthermore, at least one of such an engagement projection and an engagement groove may be extended in the axial direction of the connection terminal 50 to employ the engagement of the engagement projection and the engagement groove as a guide for insertion of the connection terminal 50 into the terminal receptacle portion 71.

Furthermore, when the socket portions 70 are arranged in a direction in which a plurality of electric power cables 60 extend, those electric power cables 60 may interfere with each other. In such a case, the length of the base portions 56 of the connection terminals 50 may be varied to avoid the interference of the electric power cables 60.

Figure 20:
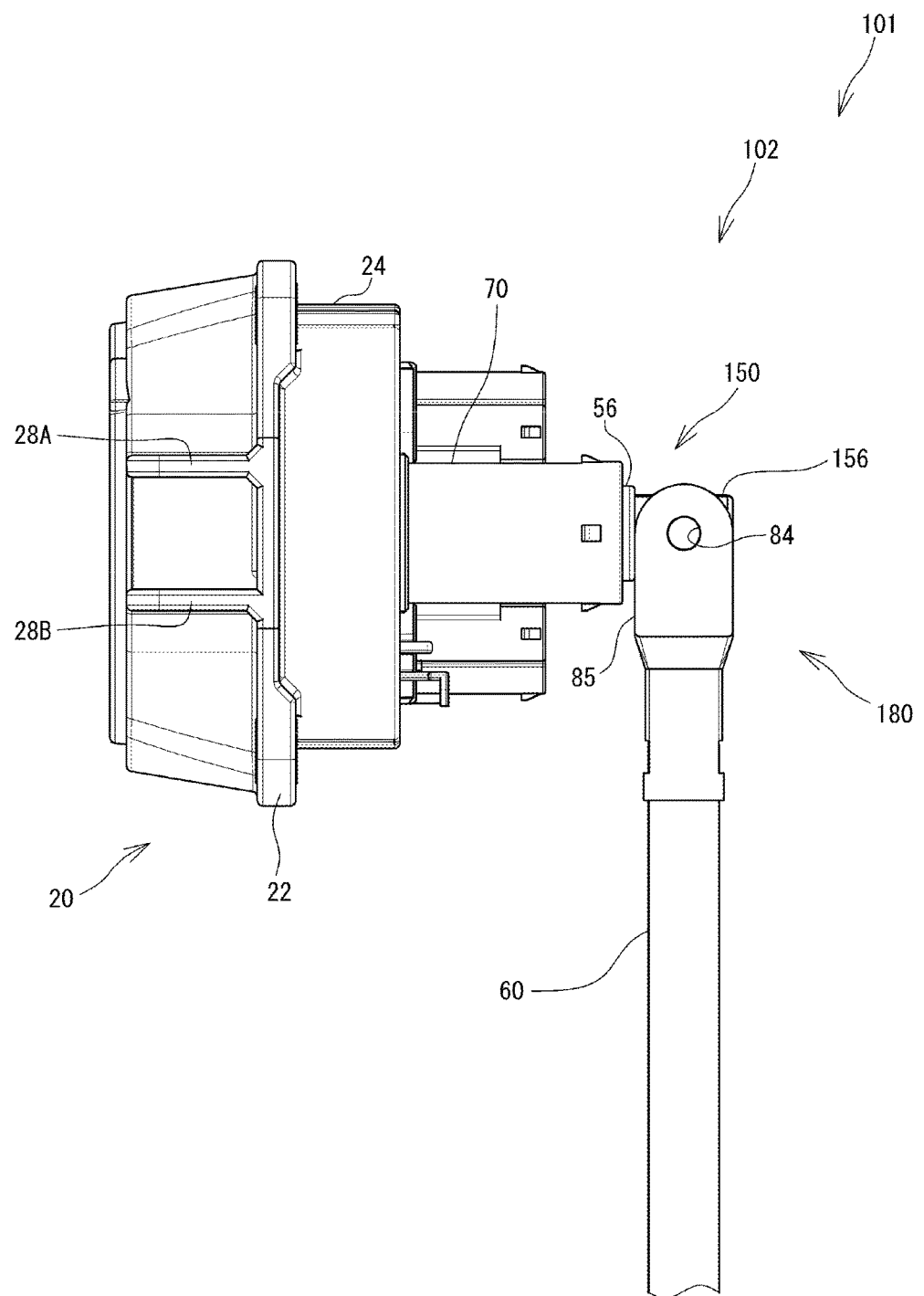
FIG. 20 is a right side view showing a charging connector assembly according to a second embodiment of the present invention.
Figure 21:
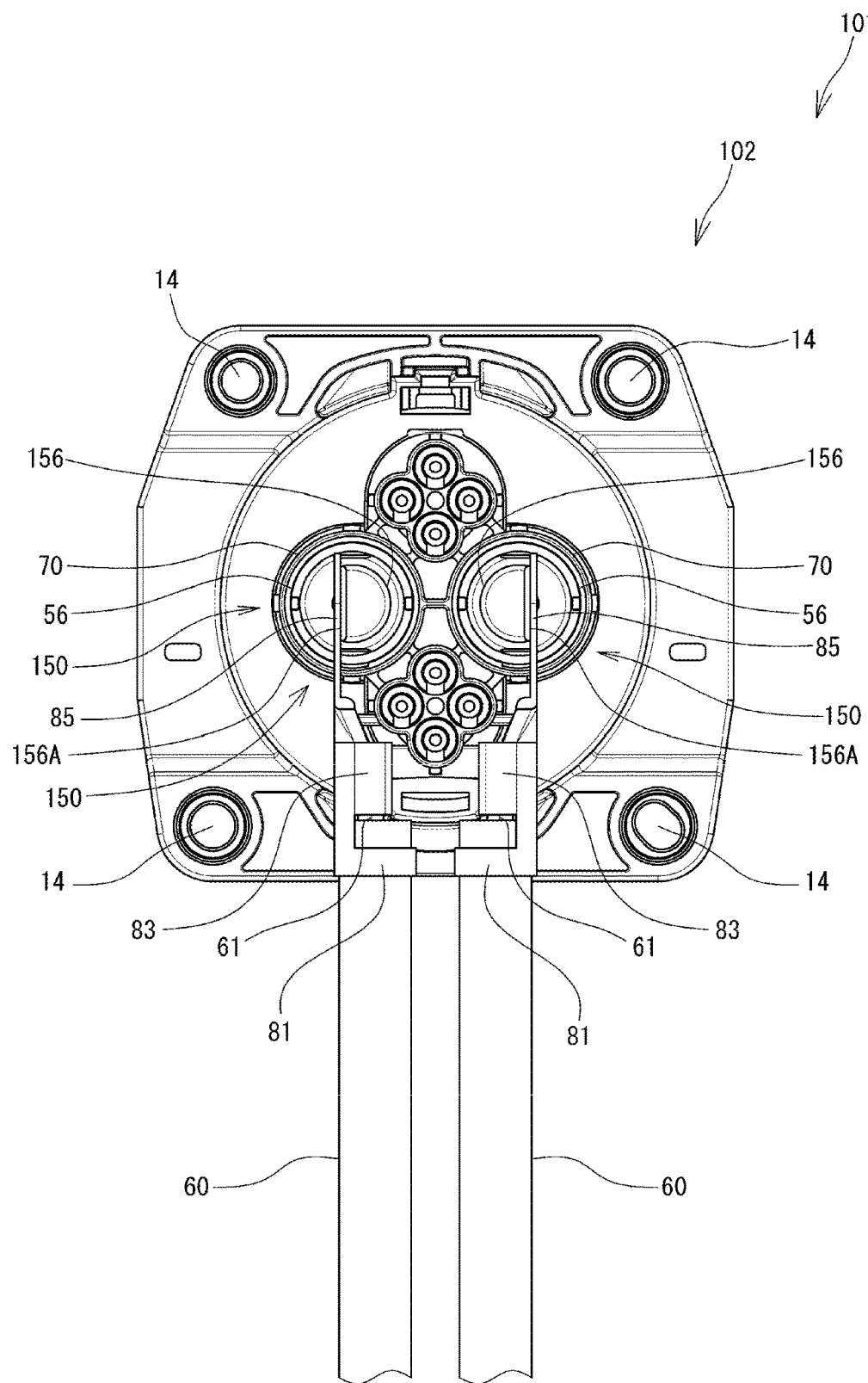
FIG. 21 is a rear view of the charging connector assembly shown in FIG. 20.
Figure 22:
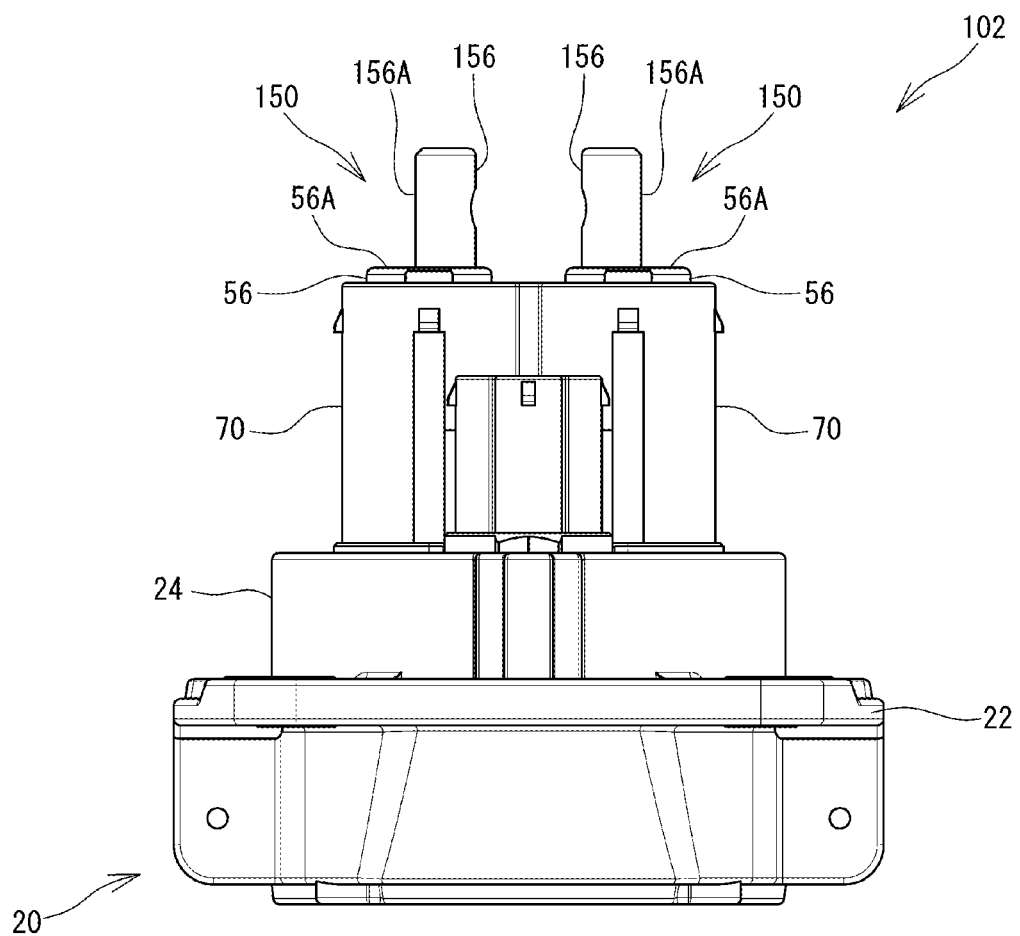
FIG. 22 is a plan view of the charging connector assembly shown in FIG. 20.

Next, a charging connector assembly 101 according to a second embodiment of the present invention will be described with reference to FIGS. 20 to 22. FIG. 20 is a right side view showing the charging connector assembly 101 of the present embodiment, FIG. 21 is a rear view thereof, and FIG. 22 is a plan view thereof. The following description mainly focuses on differences between the charging connector assembly 101 of the present embodiment and the charging connector assembly 1 of the first embodiment. Any portion of the present embodiment other than described is the same as the aforementioned first embodiment. In the present embodiment, for the sake of clarity, the electric signal cables 62 and the bolt 90 are omitted from the illustration. In FIG. 22, the fixture terminals 180 and the electric power cables 60 are also omitted from the illustration.

As shown in FIGS. 20 to 22, the connection terminal 150 of the present embodiment includes an attachment portion 156 extending rearward from the rear end face 56A of the base portion 56, in addition to the base portion 56 as described in the first embodiment. This attachment portion 156 is a semi-cylindrical segment and has an attachment surface 156A that is parallel to the axial direction of the connection terminal 150. Furthermore, a bolt hole (fastening hole), which is not illustrated, is formed in the attachment surface 156A of the attachment portion 156. The fixture terminal 180 of the present embodiment has the same arrangement as the fixture terminal 80 of the first embodiment, except that the fixture terminal 180 does not have the aforementioned engagement piece 86.

In order to manufacture such a charging connector assembly 101, as with the charging connector assembly 1 of the first embodiment, while the connection terminal 150 is first accommodated in the terminal receptacle portion of the socket portion 70, a bolt is inserted into the insertion hole 84 of the fixture terminal 180 to which the core wire 61 of the electric power cable 60 has been fixed. The flat plate portion 85 of the fixture terminal 180 is opposed to the attachment surface 156A of the attachment portion 156 of the connection terminal 150. A male screw of the bolt is threaded into a female screw of the bolt hole 58 of the attachment portion 156 of the connection terminal 150. Thus, the fixture terminal 180 is secured to the connection terminal 150 in a state in which the flat plate portion 85 of the fixture terminal 180 is in contact with the attachment surface 156A of the attachment portion 156 of the connection terminal 50. Thus, the charging connector assembly 101 of the present embodiment is produced, In the present embodiment, while the connection terminal 150 is first accommodated in the terminal receptacle portion of the socket portion 70, the electric power cable 60 can be connected to the connection terminal 150 via the fixture terminal 180. Therefore, the connection terminal 150 and the core wire 61 of the electric power cable 60 can electrically be connected to each other without excessive forces applied to the connection terminal 150. Accordingly, it is possible to prevent any contact failure resulting from cracks between the connection terminal 150 and the core wire 61 of the electric power cable 60. Furthermore, the electric power cable 60 can flexibly be routed without various restrictions imposed on insertion of the connection terminal 150 into the terminal receptacle portion. Therefore, a routing operation of the electric power cable 60 is greatly facilitated.

Figure 23:
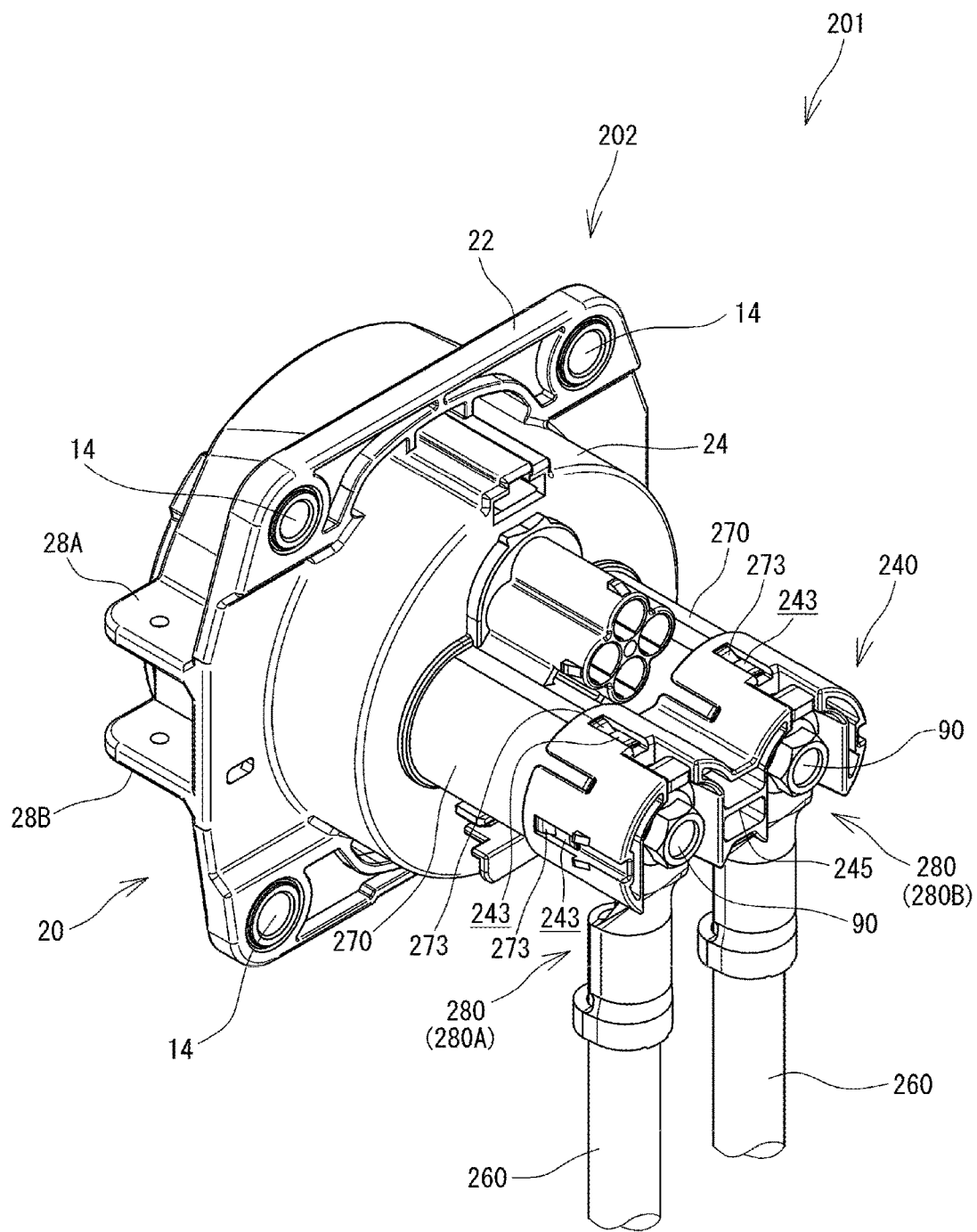
FIG. 23 is a perspective view showing a charging connector assembly according to a third embodiment of the present invention.

Next, a charging connector assembly 201 according to a third embodiment of the present invention will be described with reference to FIGS. 23 to 35. FIG. 23 is a perspective view showing a charging connector assembly 201 according to a third embodiment of the present invention. The following description mainly focuses on differences between the charging connector assembly 201 of the present embodiment and the charging connector assembly 1 of the first embodiment. Any portion of the present embodiment other than described is the same as the aforementioned first embodiment.

As shown in FIG. 23, the charging connector assembly 201 of the present embodiment includes a charging connector 202 attached to a vehicle body of an automobile such as an electric vehicle or a plug-in hybrid vehicle and electric power cables 260 connected to the charging connector 202 via fixture terminals 280. The electric power cables 260 extend to a secondary cell (not shown) for supplying electric power to an electric motor. The electric power cables 260 are connected to the charging connector 202 via the fixture terminals 280. As with the charging connector 2 of the aforementioned first embodiment, a charging plug (not shown) provided at an end of a charging cable extending from a power source can be fitted into the charging connector 202.

Figure 24:
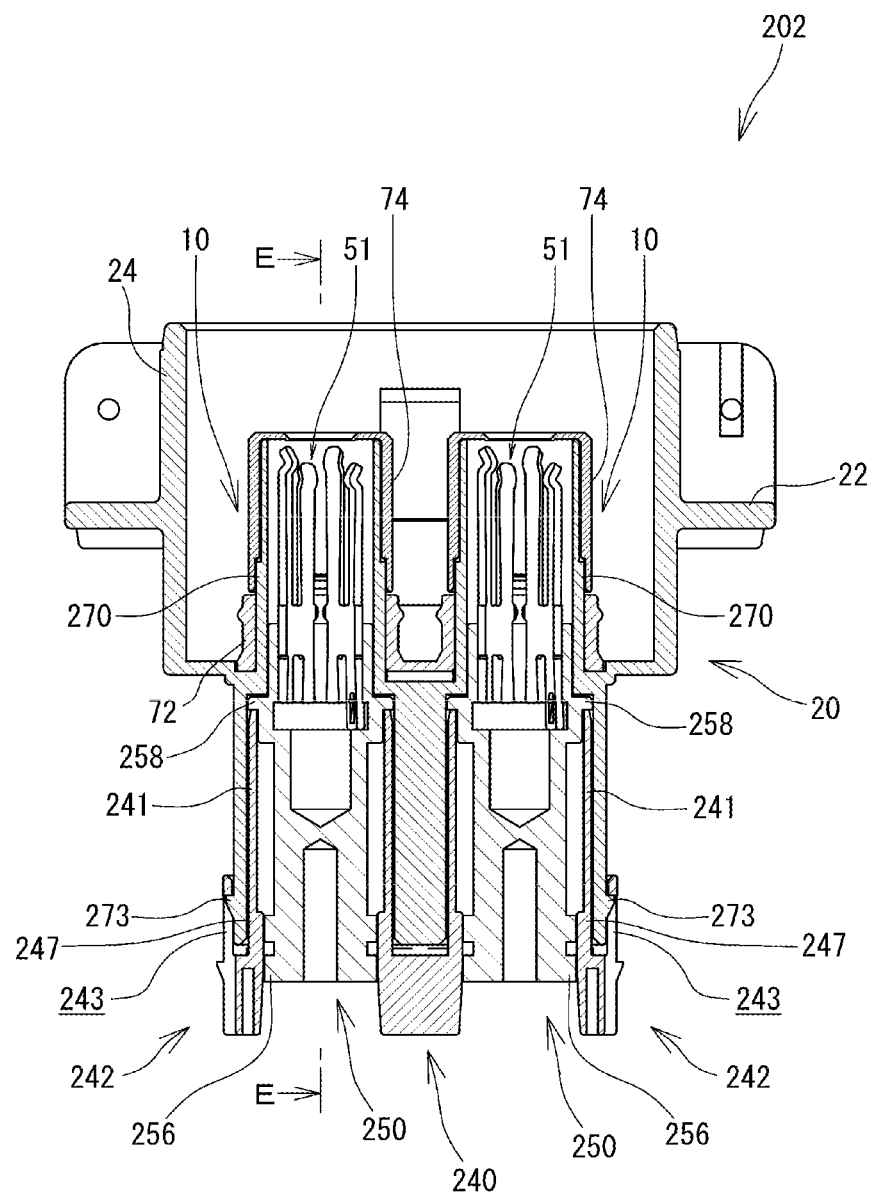
FIG. 24 is a cross-sectional view of a charging connector of the charging connector assembly shown in FIG. 23, which corresponds to the cross-sectional view taken along A-A line of FIG. 3.
Figure 25:
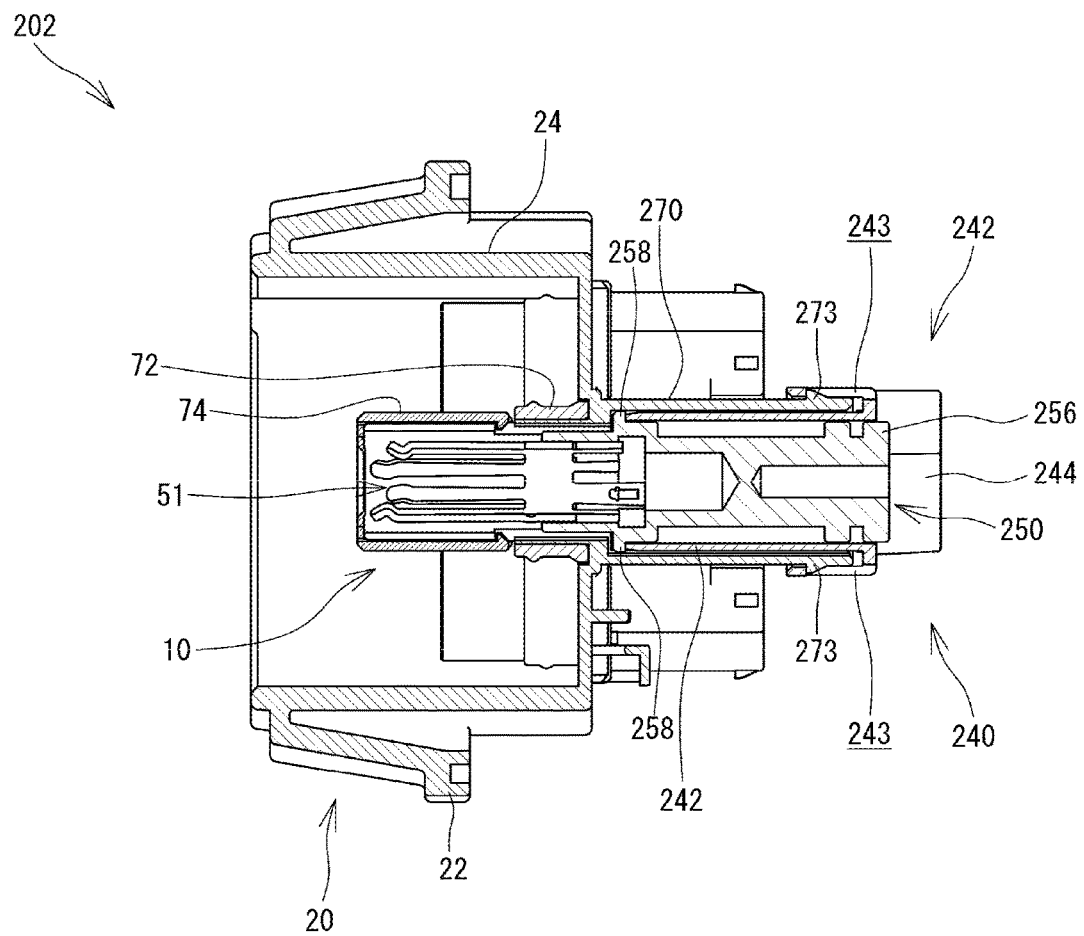
FIG. 25 is a cross-sectional view taken along line E-E of FIG. 24.

FIG. 24 is a cross-sectional view of the charging connector 202 that corresponds to the cross-sectional view taken along line A-A of FIG. 3, and FIG. 25 is a cross-sectional view taken along line E-E of FIG. 24. In FIGS. 24 and 25, for the sake of clarity, the cover member 30 (see FIG. 5) and the locking mechanism 40 (FIG. 5) are omitted from the illustration. As shown in FIGS. 24 and 25, each of the power sockets 10 of the present embodiment includes a cylindrical socket portion 270 extending along an axial direction thereof. Each of those socket portions 270 accommodates therein a connection terminal 250, which can electrically be connected to a power terminal (not shown) of the charging plug. As shown in FIG. 23, an end cap 240 is attached to a rear side of the socket portions 270 in order to prevent the connection terminals 250 from coming off the interiors of the socket portions 270.

Figure 26:
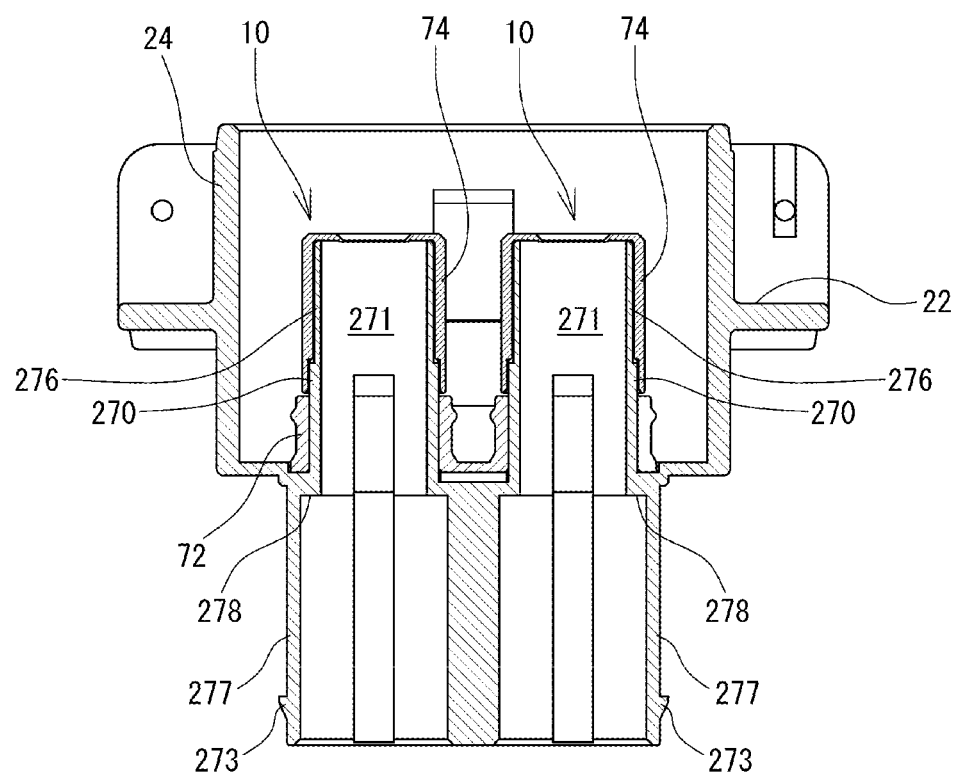
FIG. 26 is a view showing a state in which connection terminals and an end cap have been removed from the cross-sectional view of FIG. 24.

FIG. 26 is a view showing a state in which the connection terminals 250 and the end cap 240 have been removed from the cross-sectional view of FIG. 24. As shown in FIG. 26, the socket portions 270 are formed integrally with the housing 20. A terminal receptacle portion 271 for accommodating the aforementioned connection terminal 250 therein is formed radially inward of each of the socket portions 270. The diameter of the terminal receptacle portion 271 at the (front) side to which the charging plug is to be connected is smaller than the diameter of the terminal receptacle portion 271 at the (rear) side to which the electric power cable 260 is to be connected. Thus, a smaller-diameter portion 276 is formed at the side of the charging plug, and a larger-diameter portion 277 is formed at the side of the electric cable. Therefore, a stepped surface 278 is formed at an interface between the smaller-diameter portion 276 and the larger-diameter portion 277. The socket portion 270 of the present embodiment differs from the socket portion 70 of the first embodiment in that no engagement projections 79 (see FIGS. 7 to 9) are formed on the larger-diameter portion 277 of the terminal receptacle portion 271.

Figure 27:
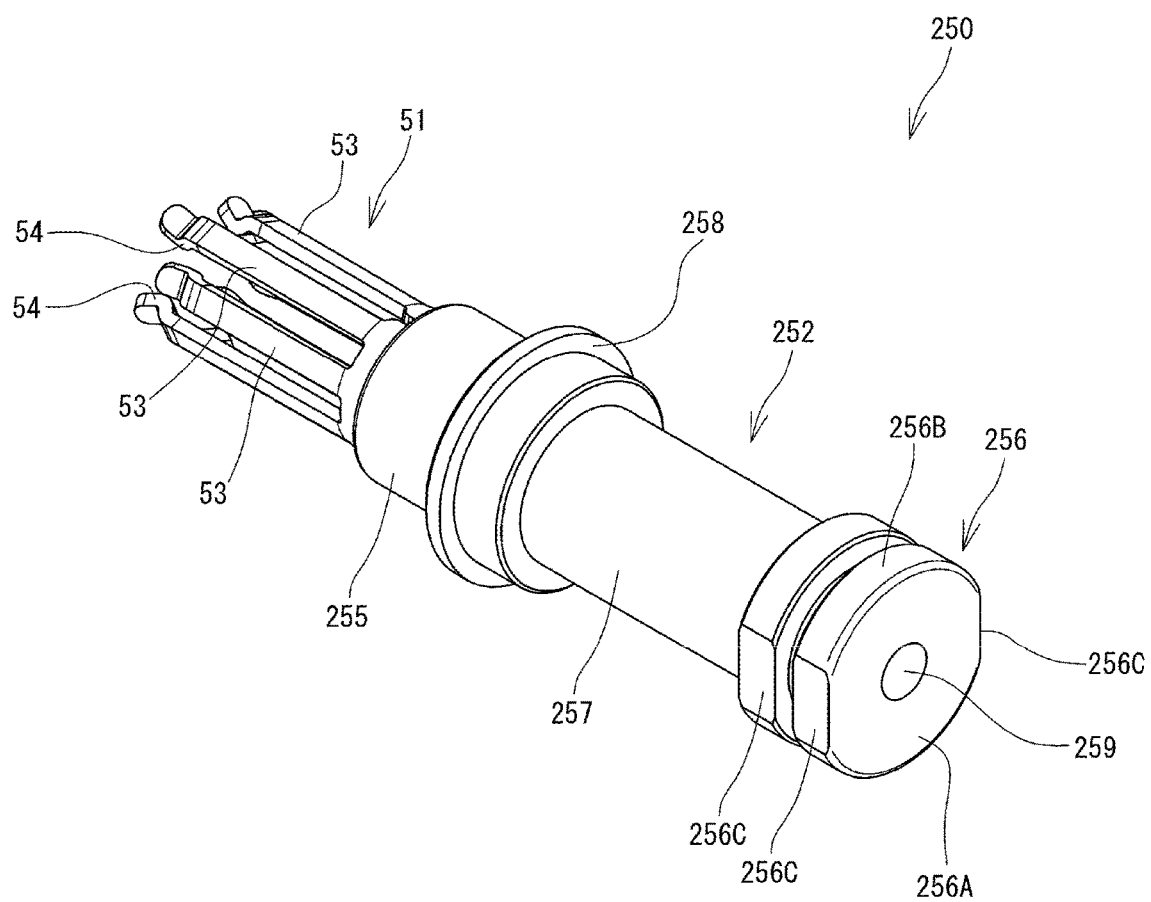
FIG. 27 is a perspective view showing a connection terminal of the charging connector shown in FIG. 24.
Figure 28:
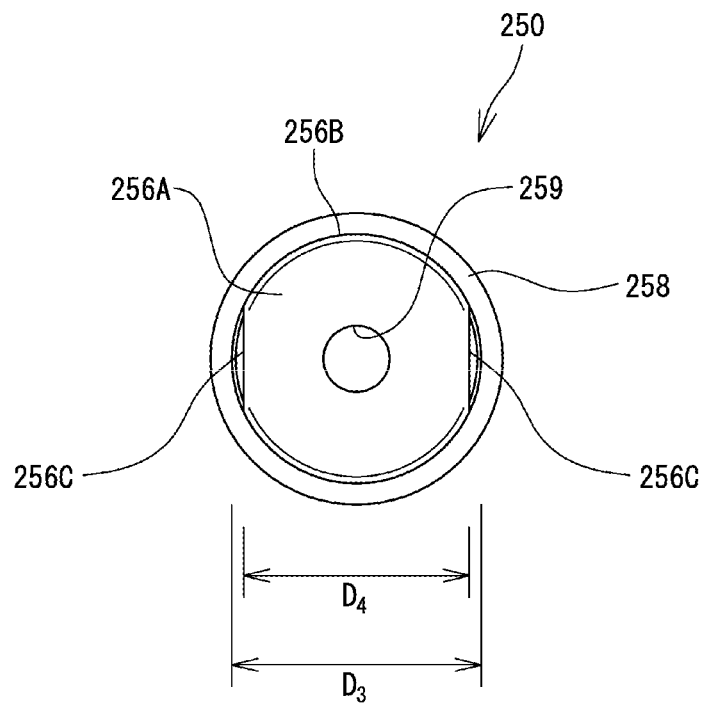
FIG. 28 is a rear view showing the connection terminal shown in FIG. 27.

FIG. 27 is a perspective view showing the connection terminal 250, and FIG. 28 is a rear view thereof. As shown in FIG. 27, the substantially cylindrical connection terminal 250 includes a plug connection portion 51 that can electrically be connected to the rod-like power terminal (not shown) of the charging plug and a terminal coupling portion 252 located at an opposite side of the plug connection portion 51 in the axial direction. The plug connection portion 51 and the terminal coupling portion 252 of the connection terminal 250 is formed of an electrically conductive material. Thus, the plug connection portion 51 and the terminal coupling portion 252 of the connection terminal 25 can electrically connect the power terminal of the charging plug connected to the plug connection portion 51 and the fixture terminal 280 connected to the terminal coupling portion 252 to each other.

The terminal coupling portion 252 of the connection terminal 250 has a cylindrical holder portion 255 for holding base portions of the respective contact pieces 53, a larger-diameter portion 256 to which the fixture terminal 280 is coupled, a smaller-diameter portion 257 having a diameter smaller than the diameter of the larger-diameter portion 256, and a flange portion 258 projecting radially outward between the holder portion 55 and the smaller-diameter portion 257. As shown in FIGS. 27 and 28, a bolt hole 259 in which a bolt 90 (see FIG. 23) for fixing the fixture terminal 280 is screwed is formed in a rear end face 256A of the larger-diameter portion 256 of the terminal coupling portion 252. A female screw is formed in an inner circumferential surface of the bolt hole 259.

When the connection terminal 250 is accommodated in the terminal receptacle portion 271 of the power socket 10, the flange portion 258 of the terminal coupling portion 252 is brought into abutment against the stepped surface 278 formed in the terminal receptacle portion 271 (see FIG. 26) to thus position the connection terminal 250 within the terminal receptacle portion 271 in the axial direction (FIGS. 24 and 25), as described below.

Furthermore, as shown in FIGS. 27 and 28, the larger-diameter portion 256 of the terminal coupling portion 252 has a circumferential surface 256B and two terminal engagement surfaces 256C. In the present embodiment, a pair of terminal engagement surfaces 256C are formed on both sides of the axis with the axis interposed therebetween.

The end cap 240 is formed of an electrically insulating material, for example a resin, and is attached to the rear face of the socket portions 270 in a detachable manner. In the present embodiment, as shown in FIG. 23, one end cap 240 is attached over two socket portions 270.

Figure 29:
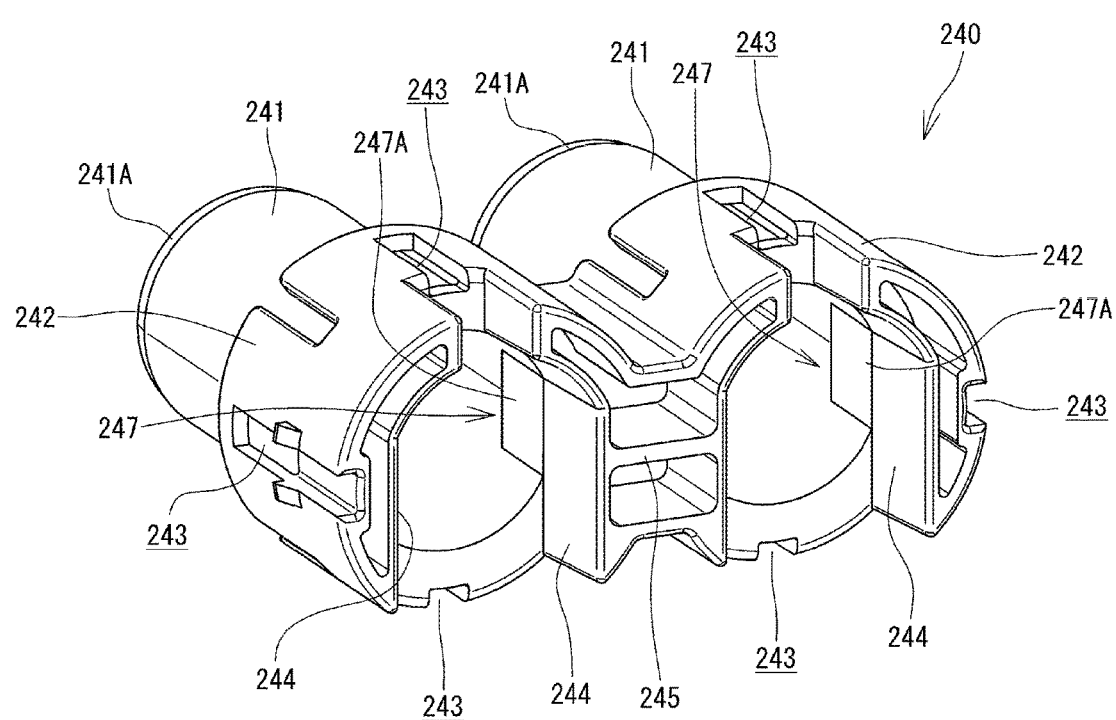
FIG. 29 is a perspective view showing an end cap of the charging connector shown in FIG. 23.
Figure 30:
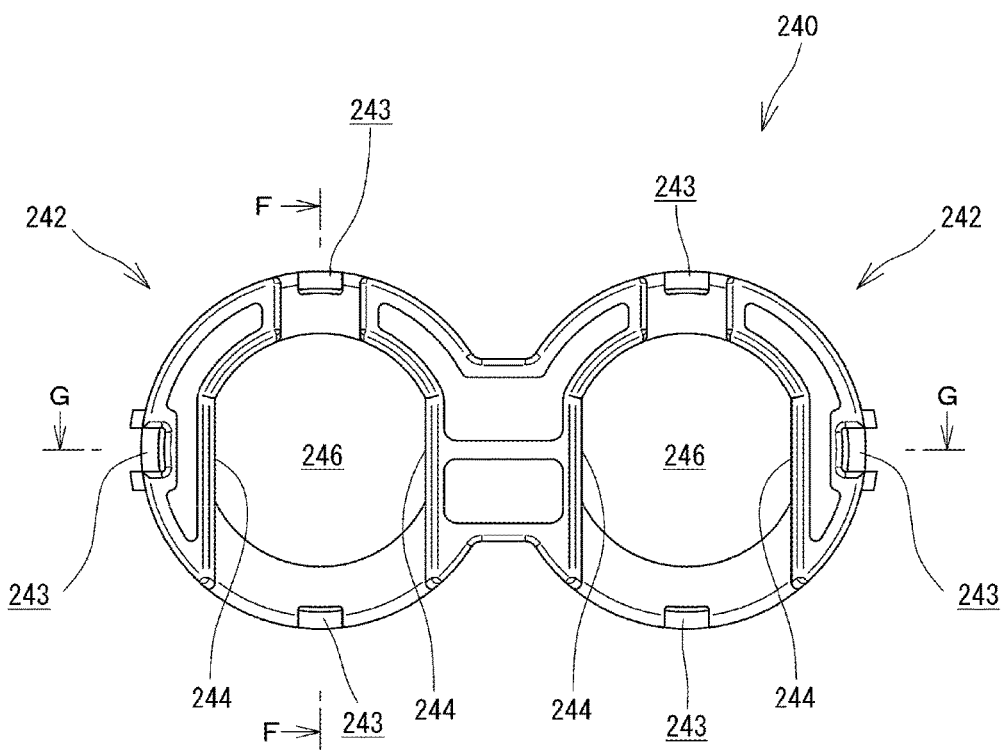
FIG. 30 is a rear view of the end cap shown in FIG. 29.
Figure 31:
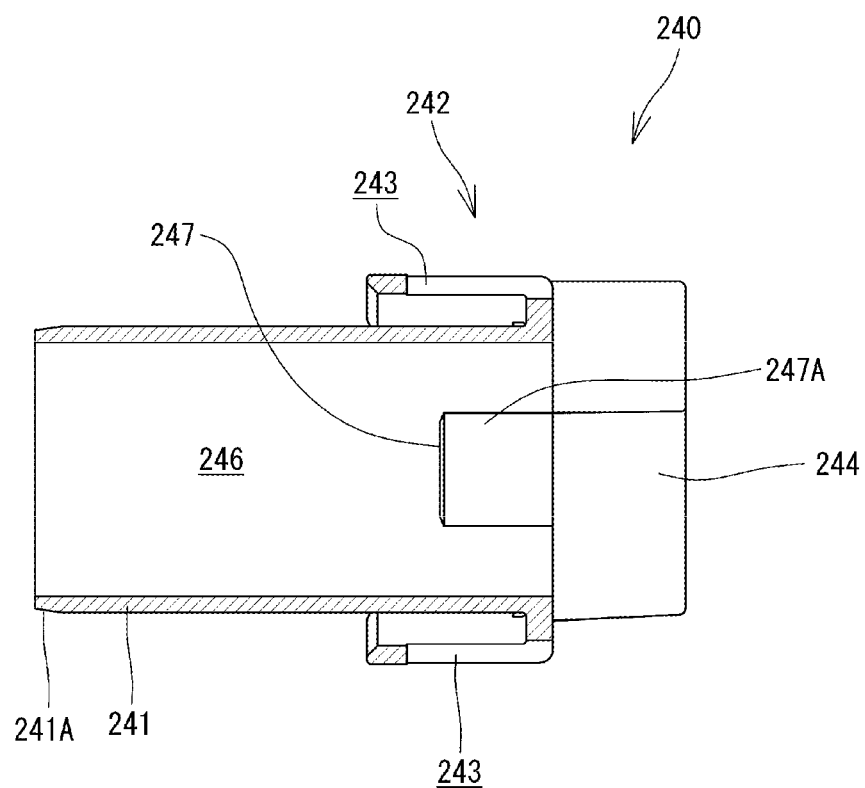
FIG. 31 is a cross-sectional view taken along line F-F of FIG. 30.
Figure 32:
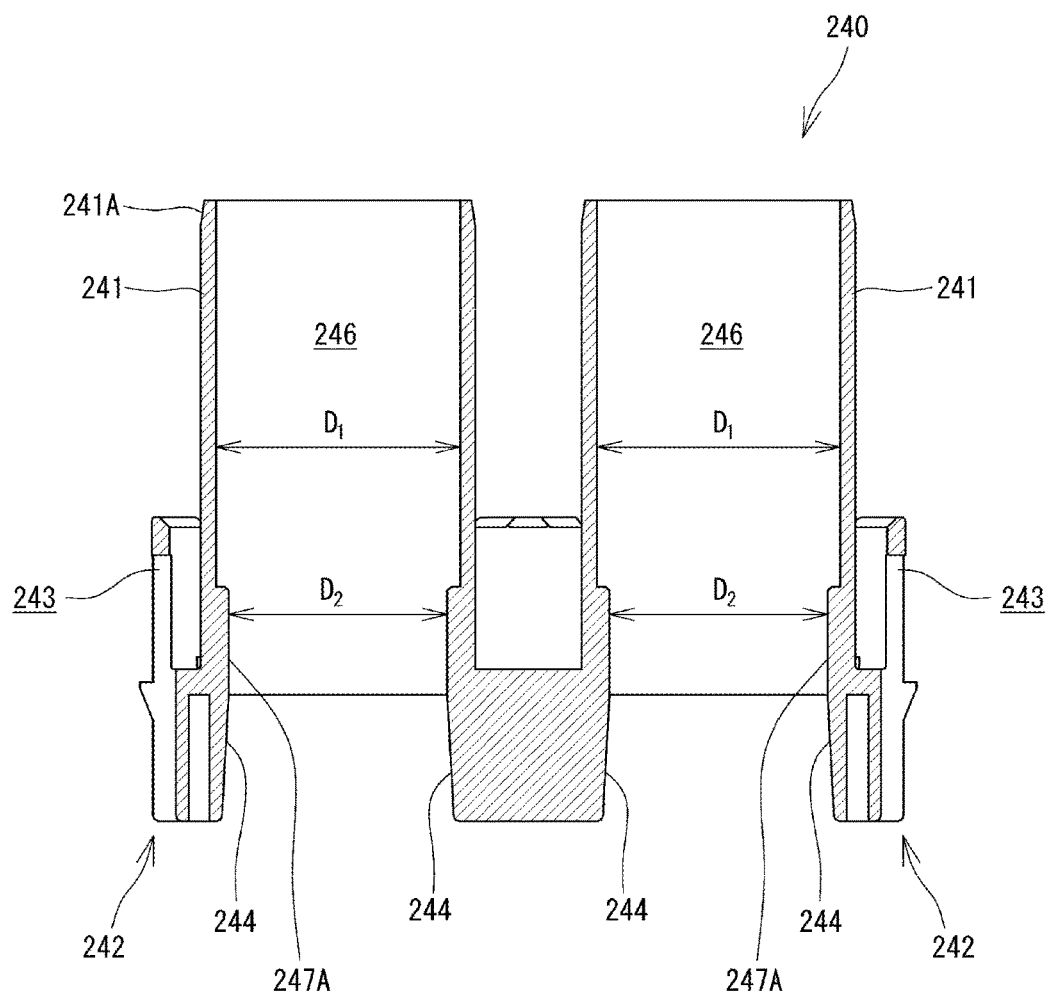
FIG. 32 is a cross-sectional view taken along line G-G of FIG. 30.

FIG. 29 is a perspective view showing the end cap 240, FIG. 30 is a rear view thereof, FIG. 31 is a cross-sectional view taken along line F-F, and FIG. 32 is a cross-sectional view taken along line G-G of FIG. 30. As shown in FIGS. 29 to 32, the end cap 240 includes two inside cylinder portions 241 inserted into the terminal receptacle portions 271 of the socket portions 270 and two cap portions 242 positioned outside of the socket portions 270 when the inside cylinder portions 241 have been inserted in the terminal receptacle portions 271. The two cap portions 242 are coupled to each other by a central coupling portion 245 positioned centrally between the two cap portions 242. Three engagement holes 243 are formed in an outer circumferential surface of each of the cap portions 242. Furthermore, each of the cap portions 242 has a pair of wall surfaces 244 extending in an opposed manner from an end of the inside cylinder portion 241 along the axial direction.

The pair of wall surfaces 244 of the end cap 240 extend in parallel to each other. As shown in FIG. 23, the fixture terminal 280 is attached along a direction in which those wall surfaces 244 extend, for drawing out the electric power cable 260. In other words, the pair of wall surfaces 244 of the end cap 240 abuts side surfaces of the fixture terminal 280 and thus serves to define an attachment direction of the fixture terminal 280 with respect to the connection terminal 250.

The inside diameter $D_1$ of each of the inside cylinder portions 241 of the end cap 240 (see FIG. 32) is slightly larger than the outside diameter $D_3$ of the larger-diameter portion 256 of the connection terminal 250 (see FIG. 28). An insertion space 246 (see FIGS. 30 to 32) extending along the axial direction is formed within each of the inside cylinder portions 241. The larger-diameter portion 256 of the connection terminal 250 can be inserted into this insertion space 246. Furthermore, as shown in FIGS. 24 and 25, a tip end 241A of the inside cylinder portion 241 is brought into abutment against the flange portion 258 of the connection terminal 250 when the end cap 240 is attached onto the socket portions 270. Therefore, the flange portion 258 of the connection terminal 250 is interposed between the stepped surface 278 of the socket portion 270 (see FIG. 26) and the tip end 241A of the inside cylinder portion 241 of the end cap 240, so that the connection terminal 250 is immovable along the axial direction within the terminal receptacle portion 271. In this manner, each of the inside cylinder portions 241 of the end cap 240 serves to regulate movement of the connection terminal 250 in the axial direction within the terminal receptacle portion 271.

As shown in FIG. 30, in the present embodiment, three engagement holes 243 are arranged along a circumferential direction at equal intervals, i.e., at intervals of 90°. Furthermore, as shown in FIG. 23, projections 273 that correspond to those engagement holes 243 are formed on an outer circumferential surface of the socket portion 270 of each of the power sockets 10 along the circumferential direction. Those projections 273 on the outer circumferential surface of the socket portion 270 are engaged with the engagement holes 243 of the end cap 240, so that the end cap 240 is attached to the socket portion 270.

As shown in FIGS. 29 and 32, cap engagement portions 247 projecting inward are formed on an inner circumferential surface of each of the inside cylinder portions 241 so as to be opposed to each other. Each of those cap engagement portions 247 has a cap engagement surface 247A corresponding to the aforementioned terminal engagement surface 256C of the larger-diameter portion 256 of the connection terminal 250 (facing the terminal engagement surface 25C). The cap engagement surface 247A extends in a continuous manner from the wall surface 244 of the cap portion 242.

The distance $D_2$ between the opposed cap engagement surfaces 247A of the end cap 240 (see FIG. 32) is shorter than the outside diameter $D_3$ of the larger-diameter portion 256 of the connection terminal 250 (see FIG. 28) and longer than the distance $D_4$ between the terminal engagement surfaces 256C formed in the larger-diameter portion 256 of the connection terminal 250 (see FIG. 28). The cap engagement surfaces 247A of the end cap 240 are formed so as to be parallel to the terminal engagement surfaces 256C of the larger-diameter portion 256 of the connection terminal 250 that has been accommodated in the socket portion 270 when the end cap 240 is attached onto the socket portions 270. Therefore, as shown in FIG. 24, when the end cap 240 is attached onto the socket portions 270, the terminal engagement surfaces 256C of the larger-diameter portion 256 of the connection terminal 250 are brought into abutment against (engagement with) the cap engagement surfaces 247A of the end cap 240. Accordingly, the cap engagement surfaces 247A of the end cap 240 and the terminal engagement surfaces 256C of the larger-diameter portion 256 of the connection terminal 250 serve as a rotation regulator structure operable to regulate rotation of the connection terminal 250 about its axis with respect to the socket portions 270 by engagement of the cap engagement surfaces 247A of the end cap 240 and the terminal engagement surfaces 256C of the larger-diameter portion 256 of the connection terminal 250.

Figure 33:
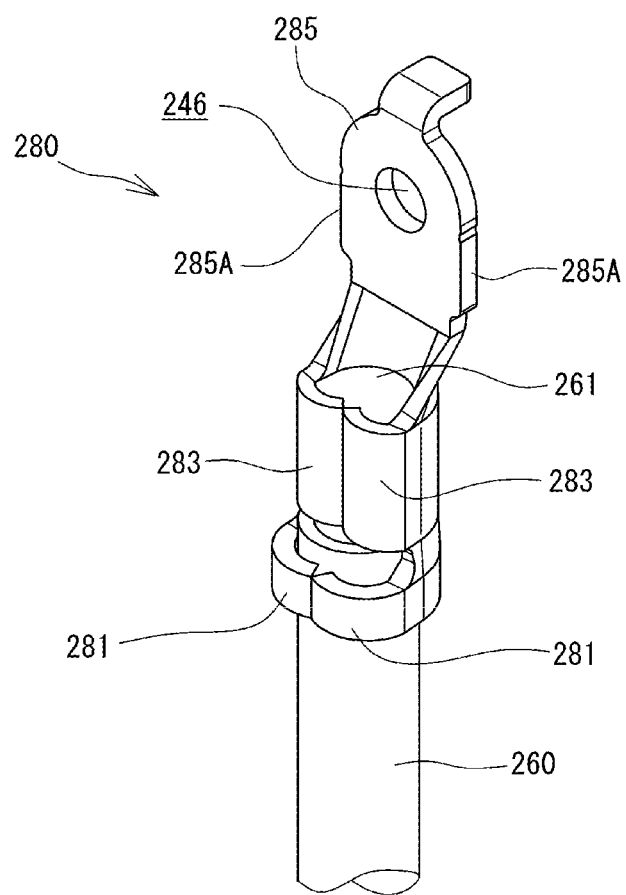
FIG. 33 is a perspective view showing an electric cable and a fixture terminal of the charging connector assembly shown in FIG. 23.

FIG. 33 is a perspective view showing the electric power cable 260 and the fixture terminal 280 attached to the electric power cable 260. This fixture terminal 280 is formed of an electrically conductive material. As shown in FIG. 33, the fixture terminal 280 has cover material fixing pieces 281 secured to a cover material of the electric power cable 260, electric cable connection pieces 283 electrically connected to a core wire 261 exposed by removing the covering of the electric power cable 260, and a flat plate portion 285 having an insertion hole 284 formed therein. The fixture terminal 280 is secured to the cover material of the electric power cable 260 by crimping the cover material fixing pieces 281. Furthermore, the fixture terminal 280 is electrically connected to the core wire 261 of the electric power cable 260 by crimping the electric cable connection pieces 283.

A bolt 90 (see FIG. 23) as a fastener for fixing the electric power cable 260 is inserted into the insertion hole 284 of the flat plate portion 285 of the fixture terminal 280. A male screw of the bolt 90 is threaded into a female screw of the bolt hole 259 of the connection terminal 250 to secure the fixture terminal 280 to the connection terminal 250. In this manner, the fixture terminal 280 is secured to the connection terminal 250, so that the core wire 261 of the electric power cable 260 and the connection terminal 250 can electrically be connected to each other.

Figure 34:
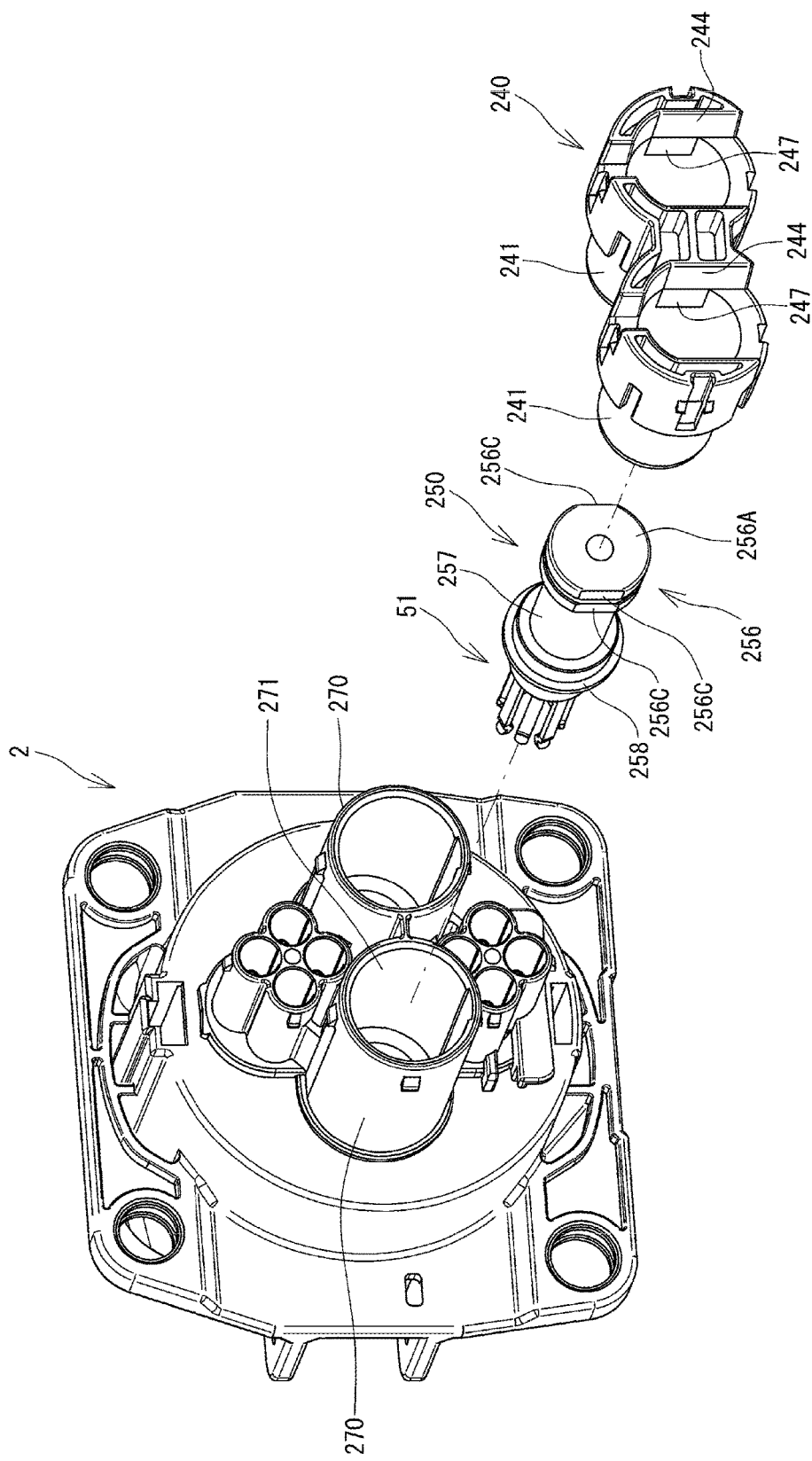
FIG. 34 is an exploded perspective view explanatory of a manufacturing process of the charging connector assembly shown in FIG. 23.

In order to manufacture such a charging connector assembly 201, the aforementioned housing 20 is first prepared. This housing 20 is attached to a location at which the charging connector 202 should be arranged, such as a side portion of a vehicle body. Then the aforementioned connection terminal 250 is prepared. As shown in FIG. 34, the plug connection portion 51 of this connection terminal 250 is directed to the terminal receptacle portion 271 of the socket portion 270, and the connection terminal 250 is inserted into the terminal receptacle portion 271 of the socket portion 270. Then, tips of the contact pieces 53 of the connection terminal 250 is introduced from the larger-diameter portion 277 to the smaller-diameter portion 276 of the terminal receptacle portion 271 (see FIG. 26). The connection terminal 250 is inserted into the terminal receptacle portion 271 until the flange portion 258 of the terminal coupling portion 252 of the connection terminal 250 is brought into abutment against the stepped surface 278 of the terminal receptacle portion 271. Thus, the positioning of the connection terminal 250 within the terminal receptacle portion 271 in the axial direction can be achieved by bringing the flange portion 258 of the terminal coupling portion 252 into abutment against the stepped surface 278 of the terminal receptacle portion 271. As a result, the plug connection portion 51 of the connection terminal 250 is accommodated in the smaller-diameter portion 276 of the terminal receptacle portion 271, and the larger-diameter portion 256 of the terminal coupling portion 252 is accommodated in the larger-diameter portion 277. Similarly, attachment of another connection terminal 250 is performed with regard to a second socket portion 270.

Next, the aforementioned end cap 240 is prepared. Each of the inside cylinder portions 241 of the end cap 240 is inserted into a space formed between the inner circumferential surface of the socket portion 270 and the outer circumferential surface of the larger-diameter portion 256 of the connection terminal 250. Specifically, the larger-diameter portion 256 of the connection terminal 250 is inserted into the insertion space 246 formed inside of the inside cylinder portion 241 of the end cap 240. Then the orientation of the end cap 240 is adjusted such that the engagement holes 243 formed in the cap portion 242 of the end cap 240 are aligned with the projections 273 formed on the outer circumferential surfaces of the socket portions 270.

As described above, the distance $D_2$ between the cap engagement surfaces 247A of the cap engagement portions 247 of the end cap 240 (see FIG. 32) is shorter than the outside diameter $D_3$ of the larger-diameter portion 256 of the connection terminal 250 (see FIG. 28). Therefore, if the terminal engagement surfaces 256C of the larger-diameter portion 256 of the connection terminal 250 is misaligned with the cap engagement surfaces 247A of the cap engagement portion 247 of the end cap 240, then the cap engagement surfaces 247A of the end cap 240 strike the rear end face 256A of the connection terminal 250 upon attachment of the end cap 240 onto the socket portions 270. Thus, the end cap 240 cannot satisfactorily be attached onto the socket portions 270. Accordingly, upon attachment of the end cap 240, the connection terminal 250 is rotated about its axis such that the terminal engagement surfaces 256C of the larger-diameter portion 256 of the connection terminal 250 are aligned with (brought into abutment against) the cap engagement surfaces 247A of the cap engagement portion 247 of the end cap 240.

In this state, the inside cylinder portions 241 of the end cap 240 are inserted into spaces between the inner circumferential surfaces of the socket portions 270 and the outer circumferential surfaces of the larger-diameter portions 256 of the connection terminals 250. The cap portions 242 of the end cap 240 are elastically deformed so as to get over the projections 273 formed on the outer circumferential surfaces of the socket portions 270. Shortly, the projections 273 are fitted into the engagement holes 243 formed in the cap portions 242. Thus, the end cap 240 is attached onto the socket portions 270, so that each of the connection terminals 250 cannot move along the axial direction or rotate about its axis within the terminal receptacle portion 271. Accordingly, the connection terminals 25 can stably be held within the terminal receptacle portions 271.

Figure 35:
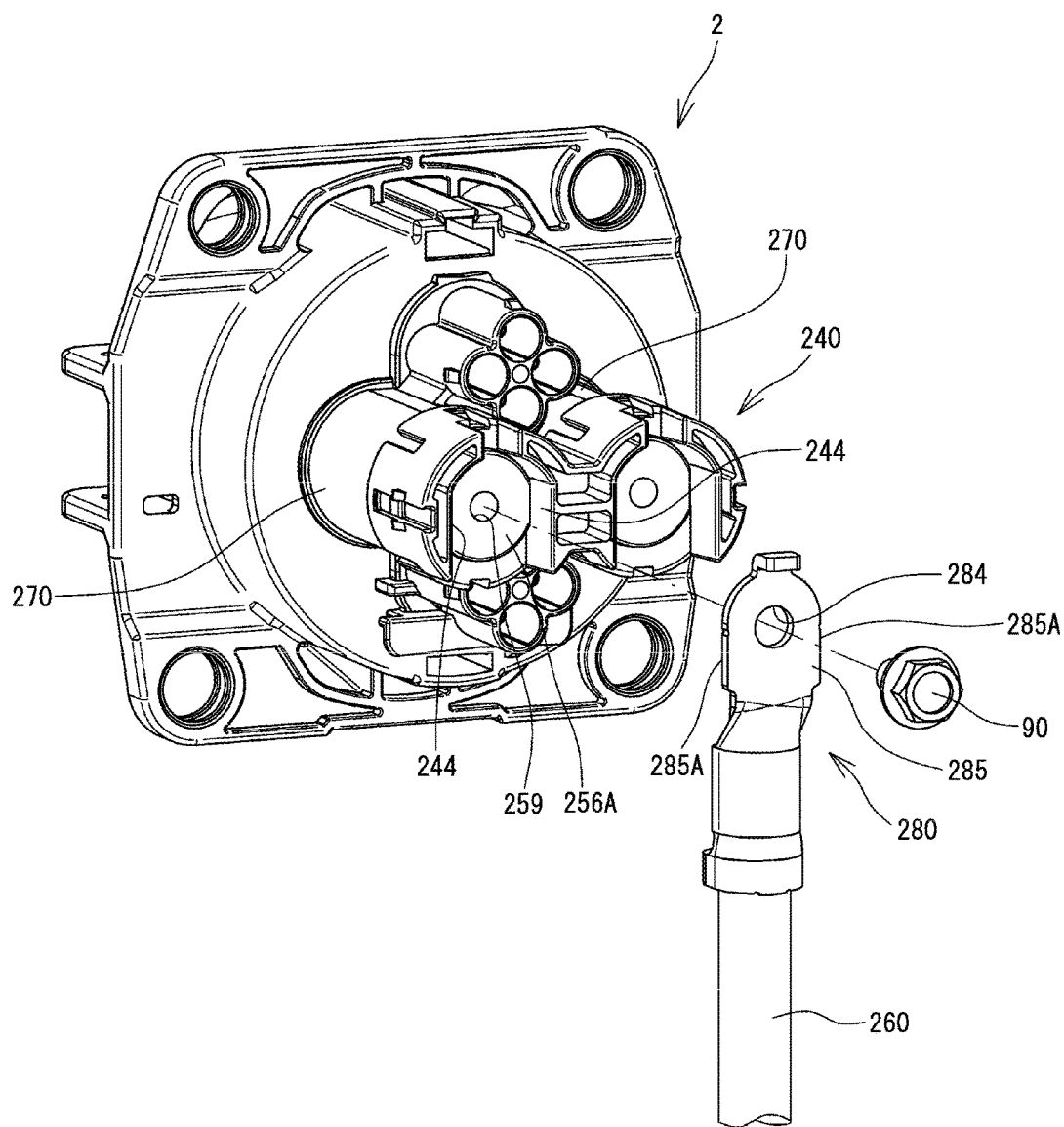
FIG. 35 is an exploded perspective view explanatory of a manufacturing process of the charging connector assembly shown in FIG. 23.

Next, as shown in FIG. 35, the electric power cable 260 with the fixture terminal 280 secured thereto is prepared, and a bolt 90 is inserted through the insertion hole 284 of the fixture terminal 280. Then the orientation of the fixture terminal 280 is adjusted such that the side surfaces 185A of the flat plate portion 185 of the fixture terminal 280 are parallel to the wall surfaces 244 of the end cap 240 attached onto the socket portions 270. Thereafter, the flat plate portion 285 of the fixture terminal 280 is opposed to the rear end face 256A of the larger-diameter portion 256 of the connection terminal 250. A male screw of the bolt 90 is threaded into a female screw of the bolt hole 259 of the connection terminal 250. Thus, the fixture terminal 280 is secured to the connection terminal 250 in a state in which the flat plate portion 285 of the fixture terminal 280 is in contact with the rear end face 256A of the connection terminal 250. At that time, a force is applied to the connection terminal 250 about the axis of the connection terminal 250 when the bolt 90 is screwed. Since the terminal engagement surface 256C of the larger-diameter portion 256 of the connection terminal 250 is engaged with the cap engagement surface 247A of the end cap 240 as described above, the connection terminal 250 is not rotated within the terminal receptacle portion 271 when the bolt 90 is screwed. Furthermore, since the flat plate portion 285 of the fixture terminal 280 is held between a pair of the wall surfaces 244 of the end cap 240, the fixture terminal 280 is not rotated with respect to the end cap 240 when the bolt 90 is screwed. In other words, the wall surfaces 244 of the end cap 240 abut the side surfaces 285A of the flat plate portion 285 of the fixture terminal 280 to regulate the rotation of the fixture terminal 280.

As described above, the core wire 261 of the electric power cable 260 can be connected to the connection terminal 250 via the fixture terminal 280 by screwing the bolt 90 into the bolt hole 259 of the connection terminal 250. Similarly, another fixture terminal 280 with an electric power cable 260 connected thereto is secured to the connection terminal 250 accommodated in another socket portion 270. In this manner, a charging connector assembly 201 as shown in FIG. 23 can be manufactured.

Thus, in the present embodiment, the connection terminals 250 are first secured in the terminal receptacle portions 271 of the socket portions 270 by attaching the end cap 240 onto the socket portions 270. Then the electric power cables 260 can be connected to the connection terminals 250 via the fixture terminals 280. Therefore, the connection terminals 250 and the core wires 261 of the electric power cables 260 can electrically be connected to each other without excessive forces applied to the connection terminals 250. Accordingly, it is possible to prevent any contact failure resulting from cracks between the connection terminals 250 and the core wires 61 of the electric power cables 260. Furthermore, the electric power cables 260 can flexibly be routed without various restrictions imposed on insertion of the connection terminals 250 into the terminal receptacle portions 271. Therefore, a routing operation of the electric power cables 260 is greatly facilitated.

In the state illustrated in FIG. 23, the central coupling portion 245 is located between the fixture terminal 280A and the fixture terminal 280B of the end cap 240. In other words, according to the present embodiment, each of the wall surfaces 244 of the two cap portions 242 extends perpendicular to a direction in which the socket portions 270 is arranged adjacent to each other, and the central coupling portion 245 is located between those wall surfaces 244. In this manner, the central coupling portion 245 of the end cap 240, which has an electrical insulating property, is located between the fixture terminal 280A and the fixture terminal 280B. Thus, the creepage distance can be lengthened between the fixture terminal 280A and the fixture terminal 280B. Accordingly, the safety upon attachment of a high-voltage electric power cable 260 to the charging connector 202 can be enhanced.

Meanwhile, in automobiles having an internal combustion engine, such as hybrid vehicles, the bolt 90 may be loosened due to vibration caused by the internal combustion engine to cause insufficient electrical connection between the fixture terminal 280 and the connection terminal 250. According to the present embodiment, since the terminal engagement surfaces 256C of the larger-diameter portion 256 of the connection terminal 250 are engaged with the wall surfaces 244 of the end cap 240 as described above, the connection terminal 250 does not rotate with respect to the end cap 240. Furthermore, since the flat plate portion 285 of the fixture terminal 280 is held between the wall surfaces 244 of each of the cap portions 242, the fixture terminal 280 does not rotate with respect to the end cap 240. Therefore, even if vibration is transmitted to the fixture terminal 280 from the internal combustion engine, the fixture terminal 280 or the connection terminal 250 does not rotate with respect to the end cap 240, and the bolt 90 is not loosened. Accordingly, good electrical connection can be maintained between the fixture terminal 280 and the connection terminal 250.

In the aforementioned embodiment, the engagement holes 243 are formed in the end cap 240, and the projections 273 are formed on the socket portions 270 as engagement portions that are engaged with those engagement holes 243. The present invention is not limited to this example. For example, an engagement hole may be formed in the socket portions 270, and an engagement portion that is engaged with the engagement hole, such as a projection, may be formed on the end cap 240.

In the aforementioned embodiments, a bolt is used as a fastener for fastening the fixture terminal to the connection terminal. Nevertheless, such a fastener is not limited to a bolt.

Although some preferred embodiments of the present invention have been described, the present invention is not limited to the aforementioned embodiments. It should be understood that various different forms may be applied to the present invention within the technical idea thereof.

INDUSTRIAL APPLICABILITY

The present invention is stably used for a charging connector provided on an electric vehicle or a plug-in hybrid vehicle.

DESCRIPTION OF REFERENCE NUMERALS AND SIGNS 1 charging connector assembly
2 charging connector
10 power socket
12 signal line socket
14 fixation hole
20 housing
22 plate portion
24 socket receptacle portion
30 cover member
40 locking mechanism
50 connection terminal
51 plug connection portion
52 terminal coupling portion
53 contact piece
54 curved portion
55 holder portion
56 base portion
56A rear end face (attachment surface)
56B flat surface (engagement surface)
57 flange portion
58 bolt hole (fastening hole)
59 engagement groove (terminal engagement portion)
60 electric power cable
61 core wire
62 electric signal cable
70 socket portion
71 terminal receptacle portion
72 seal member
74 housing cap
74A insertion hole
75A electric cable side opening
75B charging plug side opening
76 smaller-diameter portion
77 larger-diameter portion
78 stepped surface
79 engagement projection (socket engagement portion)
80 fixture terminal
81 electric cable holder portion
83 electric cable fixing piece
84 insertion hole
85 flat plate portion
86 engagement piece
90 bolt
101 charging connector assembly
150 connection terminal
156 attachment portion
156A attachment surface
180 fixture terminal
201 charging connector assembly
202 charging connector
240 end cap
241 inside cylinder portion 242 cap portion
243 engagement hole
244 wall surface
245 central coupling portion
246 insertion space
247 cap engagement portion
247A cap engagement surface
250 connection terminal
252 terminal coupling portion
255 holder portion
256 larger-diameter portion
256A rear end face
256B circumferential surface
256C terminal engagement surface
257 smaller-diameter portion
258 flange portion
259 bolt hole
260 electric power cable
261 core wire
270 socket portion
271 terminal receptacle portion
273 projection
276 smaller-diameter portion
277 larger-diameter portion
278 stepped surface
280 fixture terminal
281 cover material fixing piece
283 electric cable connection piece
284 insertion hole
285 flat plate portion
285A side surface

The invention claimed is:

1. A charging connector for electrically connecting an electric cable connected via a fixture terminal and a charging plug to each other, the charging connector comprising:
   a housing having at least one socket portion extending along an axial direction;
   a conductive connection terminal accommodated in a terminal receptacle portion formed radially inward of the socket portion, the connection terminal including:
      a plug connection portion to which a terminal of the charging plug can be connected, and
      a terminal coupling portion located at an opposite side of the plug connection portion in the axial direction, the fixture terminal being coupled to the terminal coupling portion; and
   a rotation regulator structure operable to regulate rotation of the connection terminal about its axis with respect to the socket portion.

2. The charging connector as recited in claim 1, wherein the rotation regulator structure includes at least one terminal engagement portion formed on the connection terminal and at least one socket engagement portion formed on the socket portion, and regulates rotation of the connection terminal by engagement of the at least one terminal engagement portion and the at least one socket engagement portion.

3. The charging connector as recited in claim 2, wherein the at least one terminal engagement portion includes a plurality of terminal engagement portions formed at locations that are symmetrical to each other with respect to an axis of the connection terminal.

4. The charging connector as recited in claim 1, wherein the at least one socket engagement portion includes a plurality of socket engagement portions formed at locations that are symmetrical to each other with respect to an axis of the socket portion.

5. The charging connector as recited in claim 1, wherein the terminal coupling portion of the connection terminal has an engagement surface with which an engagement piece provided on the fixture terminal is engaged.

6. The charging connector as recited in claim 1, wherein the terminal coupling portion of the connection terminal has an attachment surface that is perpendicular to the axial direction of the connection terminal, wherein the fixture terminal secured to the connection terminal is in contact with the attachment surface.

7. charging connector as recited in claim 1, wherein the terminal coupling portion of the connection terminal has an attachment surface that is in parallel to the axial direction of the connection terminal, wherein the fixture terminal secured to the connection terminal is in contact with the attachment surface.

8. The charging connector as recited in claim 1, further comprising an end cap detachably attached to an end of the socket portion so as to hold the connection terminal within the terminal receptacle portion,
   wherein the rotation regulator structure includes at least one terminal engagement portion formed on the connection terminal and at least one cap engagement portion formed on the end cap, and regulates rotation of the connection terminal by engagement of the at least one terminal engagement portion and the at least one cap engagement portion.

9. The charging connector as recited in claim 8, wherein the at least one terminal engagement portion is formed on the terminal coupling portion of the connection terminal.

10. The charging connector as recited in claim 9, wherein the terminal coupling portion of the connection terminal includes a larger-diameter portion on which the at least one terminal engagement portion is formed and a smaller-diameter portion having a diameter smaller than a diameter of the larger-diameter portion.

11. The charging connector as recited in claim 8, wherein the at least one terminal engagement portion has a terminal engagement surface extending in parallel to the axis of the connection terminal, and
   wherein the at least one cap engagement portion has a cap engagement surface extending in parallel to the terminal engagement surface.

12. The charging connector as recited in claim 8, wherein the end cap has at least one cap portion having a wall surface configured to abut a side surface of the fixture terminal to regulate rotation of the fixture terminal.

13. The charging connector as recited in claim 12, wherein the at least one terminal engagement portion has a terminal engagement surface extending in parallel to the axis of the connection terminal, and
   wherein the at least one cap engagement portion has a cap engagement surface extending in a continuous manner from the wall surface of the cap portion and in parallel to the terminal engagement surface.

14. The charging connector as recited in claim 12, wherein the at least one socket portion includes a plurality of socket portions arranged adjacent to each other,
   wherein the at least one cap portion includes a plurality of cap portions provided so as to correspond to the plurality of socket portions arranged adjacent to each other, and
   wherein the wall surface of each of the plurality of cap portions extends perpendicular to a direction in which the plurality of socket portions are arranged adjacent to each other.

15. A method of manufacturing a charging connector assembly including a charging connector to which a charging plug can be attached and an electric cable connected to the charging connector, the method comprising:
- preparing a housing having a cylindrical socket portion with a terminal receptacle portion formed inward of the socket portion;
- preparing a conductive connection terminal having a plug connection portion to which a terminal of the charging plug can be connected and a terminal coupling portion located at an opposite side of the plug connection portion in an axial direction;
- inserting the connection terminal into the terminal receptacle portion of the socket portion along the axial direction while engaging at least one terminal engagement portion formed on the connection terminal and at least one socket engagement portion formed on the socket portion with each other to regulate rotation of the connection terminal about its axis with respect to the socket portion;
- preparing a conductive fixture terminal having an insertion hole formed therein;
- securing an end of the electric cable to the fixture terminal to electrically connect the electric cable to the fixture terminal; and
- after the inserting the connection terminal into the terminal receptacle portion of the socket portion, inserting a fastener through the insertion hole of the fixture terminal to which the end of the electric cable has been secured, and fastening the fastener to a fastening hole formed in the terminal coupling portion of the connection terminal to secure the fixture terminal to the connection terminal.

16. A method of manufacturing a charging connector assembly including a charging connector to which a charging plug can be attached and an electric cable connected to the charging connector, the method comprising:
- preparing a housing having a cylindrical socket portion with a terminal receptacle portion formed inward of the socket portion;
- preparing a conductive connection terminal having a plug connection portion to which a terminal of the charging plug can be connected and a terminal coupling portion located at an opposite side of the plug connection portion in an axial direction;
- inserting the connection terminal into the terminal receptacle portion of the socket portion along the axial direction;
- preparing an end cap for holding the connection terminal within the terminal receptacle portion;
- attaching the end cap to an end of the socket portion while engaging at least one terminal engagement portion formed on the connection terminal and at least one cap engagement portion formed on the end cap with each other to regulate rotation of the connection terminal about its axis with respect to the socket portion;
- preparing a conductive fixture terminal having an insertion hole formed therein;
- securing an end of the electric cable to the fixture terminal to electrically connect the electric cable to the fixture terminal; and
- after the attaching the end cap to the end of the socket portion, inserting a fastener through the insertion hole of the fixture terminal to which the end of the electric cable has been secured, and fastening the fastener to a fastening hole formed in the terminal coupling portion of the connection terminal to secure the fixture terminal to the connection terminal.

* * * * *